US010935667B2

(12) United States Patent
Hoshi et al.

(10) Patent No.: US 10,935,667 B2
(45) Date of Patent: Mar. 2, 2021

(54) INFORMATION PROCESSING DEVICE, INFORMATION PROCESSING METHOD, PROGRAM, AND STORAGE MEDIUM

(71) Applicant: Rakuten, Inc., Tokyo (JP)

(72) Inventors: Nagaaki Hoshi, Tokyo (JP); Lin Zhong, Tokyo (JP); Kenji Nakamura, Tokyo (JP)

(73) Assignee: Rakuten, Inc., Tokyo (JP)

( * ) Notice: Subject to any disclaimer, the term of this patent is extended or adjusted under 35 U.S.C. 154(b) by 488 days.

(21) Appl. No.: 15/848,444

(22) Filed: Dec. 20, 2017

(65) Prior Publication Data

US 2018/0113220 A1 Apr. 26, 2018

Related U.S. Application Data

(63) Continuation of application No. PCT/JP2015/085817, filed on Dec. 22, 2015.

(30) Foreign Application Priority Data

Dec. 21, 2016 (JP) ............................. JP2016-247900

(51) Int. Cl.
*G06Q 30/00* (2012.01)
*G01S 19/42* (2010.01)
(Continued)

(52) U.S. Cl.
CPC .............. *G01S 19/42* (2013.01); *G01S 19/24* (2013.01); *G01S 19/48* (2013.01);
(Continued)

(58) Field of Classification Search
CPC .......... G01S 19/42; G01S 19/48; G01S 19/24; G06Q 30/0207; G06Q 30/0267; H04W 88/02
(Continued)

(56) References Cited

U.S. PATENT DOCUMENTS 6,360,167 B1 * 3/2002 Millington ............. G01C 21/26
342/357.31
6,505,118 B2 * 1/2003 Chowanic .......... G01C 21/3484
340/906
(Continued)

FOREIGN PATENT DOCUMENTS

JP 2002-015208 A 1/2002
JP 2004-220498 A 8/2004
(Continued)

OTHER PUBLICATIONS

Perez, S. Aparicio et al. "A Fusion Method Based on Bluetooth and WLAN Technologies for Indoor Location." IEEE International Conference, Seoul Korea, 2008. (Year: 2008).*
(Continued)

*Primary Examiner* — Luis A Brown
(74) *Attorney, Agent, or Firm* — Sughrue Mion, PLLC

(57) ABSTRACT

The information processing device includes: a distribution target determination unit configured to determine that a terminal located within a first predetermined range and detected by a first detection technique (e.g. GPS) is a first distribution target terminal and that a terminal located within and detected by a second detection technique (e.g. beacon) is a second distribution target terminal, where the second predetermined range is included in the first predetermined range; a distribution request acquisition unit configured to acquire a distribution request from a distribution requester terminal; and an information distribution unit configured to distribute information corresponding to the distribution request to at least the first distribution target terminal, the first distribution target terminal not overlapping with the second distribution terminal, or the second distribution target terminal.

8 Claims, 23 Drawing Sheets

(51) Int. Cl.
*G01S 19/48* (2010.01)
*G06Q 30/02* (2012.01)
*G01S 19/24* (2010.01)
*H04W 88/02* (2009.01)

(52) U.S. Cl.
CPC ..... *G06Q 30/0261* (2013.01); *G06Q 30/0207* (2013.01); *G06Q 30/0267* (2013.01); *H04W 88/02* (2013.01)

(58) Field of Classification Search
USPC ..................................................... 705/14.64
See application file for complete search history.

(56) References Cited

U.S. PATENT DOCUMENTS

| | | | | |
|---|---|---|---|---|
| 6,738,711 | B2* | 5/2004 | Ohmura | G01C 21/32 701/451 |
| 7,020,623 | B1* | 3/2006 | Tiley | G06Q 30/02 705/14.23 |
| 2002/0032035 | A1* | 3/2002 | Teshima | G09F 21/04 455/456.3 |
| 2002/0095333 | A1* | 7/2002 | Jokinen | G06Q 30/0207 705/14.26 |
| 2005/0192008 | A1* | 9/2005 | Desai | G06F 21/604 455/435.2 |
| 2006/0286989 | A1* | 12/2006 | Illion | G06Q 30/02 455/456.3 |
| 2007/0010942 | A1* | 1/2007 | Bill | G01C 21/3617 701/424 |
| 2007/0271035 | A1* | 11/2007 | Stoschek | G01C 21/3697 701/533 |
| 2008/0284588 | A1* | 11/2008 | Kim | G01S 19/48 340/539.13 |
| 2009/0132353 | A1* | 5/2009 | Maggenti | G06Q 30/08 705/14.1 |
| 2009/0191962 | A1* | 7/2009 | Hardy | G07F 17/3239 463/29 |
| 2010/0146091 | A1* | 6/2010 | Curtis | H04L 65/602 709/223 |
| 2011/0112892 | A1* | 5/2011 | Tarantino | G07F 17/32 705/14.1 |
| 2012/0276928 | A1* | 11/2012 | Shutter | G06Q 30/02 455/456.3 |
| 2013/0013397 | A1* | 1/2013 | Levenson | G06Q 30/00 705/14.48 |
| 2013/0203443 | A1* | 8/2013 | Heater | H04W 4/021 455/456.3 |
| 2014/0080517 | A1* | 3/2014 | Martinez Olano | H04L 61/1541 455/456.2 |
| 2014/0222438 | A1* | 8/2014 | Courtney, III | G10L 19/018 704/500 |
| 2014/0273921 | A1* | 9/2014 | Li | H04W 4/022 455/405 |
| 2014/0278978 | A1* | 9/2014 | O'Connor | G06Q 30/0255 705/14.53 |
| 2015/0084769 | A1* | 3/2015 | Messier | G08B 21/0446 340/539.13 |
| 2015/0103248 | A1* | 4/2015 | Zealer | H04N 5/44 348/553 |
| 2015/0178782 | A1 | 6/2015 | Kim et al. | |
| 2015/0247913 | A1* | 9/2015 | Messier | G01S 5/0027 340/539.13 |
| 2015/0371270 | A1* | 12/2015 | McDevitt | G06Q 30/0261 705/14.58 |
| 2015/0381689 | A1* | 12/2015 | Ganesh | H04L 65/604 705/14.58 |
| 2016/0054428 | A1* | 2/2016 | Eldic | G01S 5/02 455/574 |
| 2016/0292711 | A1* | 10/2016 | Cho | G06Q 30/0238 |
| 2017/0061424 | A1* | 3/2017 | Dent | G06Q 20/3227 |
| 2017/0109789 | A1* | 4/2017 | Major | G06Q 30/0261 |
| 2017/0214653 | A1* | 7/2017 | Shigeeda | H04L 61/2015 |
| 2018/0060920 | A1* | 3/2018 | Beaven | G06F 3/147 |
| 2018/0357671 | A1* | 12/2018 | Oliveria | G06F 16/29 |
| 2019/0026132 | A1* | 1/2019 | King | G06Q 30/016 |

FOREIGN PATENT DOCUMENTS

| | | |
|---|---|---|
| JP | 2009-265703 A | 11/2009 |
| JP | 2010-225090 A | 10/2010 |
| JP | 2015-070424 A | 4/2015 |
| WO | 2014/006710 A1 | 1/2014 |

OTHER PUBLICATIONS

Li, Binghao, et al. "Indoor Positioning Techniques Based on Wireless LAN." School of Computer Science and Engineering, UNSW, Sydney, 2012. (Year: 2012).*

Pei, Ling et al. "Indoor/Outdoor Seamless Positioning Technologies Integrated on Smartphone." First International Conference on Advances in Satellite and Space Communications, Masala, Finland, 2009. (Year: 2009).*

Pandya, Dhruv, et al. "Indoor Location Estimation using Multiple Wireless Technologies." IEEE 2003 International Symposium on Personal, Indoor and Mobile Radio Communication Proceedings. (Year: 2003).*

International Search Report for PCT/JP2015/085817, dated Apr. 5, 2016.

* cited by examiner

FIG. 4

| USER ID | NAME | ADDRESS | ATTRIBUTE INFORMATION |
|---|---|---|---|
| ⋮ | ⋮ | ⋮ | ⋮ |

FIG. 5

| USER ID | LOCATION INFORMATION | RECEPTION DATA & TIME | DISTRIBUTION CANDIDATE FLAG | DISTRIBUTION TARGET PERSON FLAG |
|---|---|---|---|---|
| ⋮ | ⋮ | ⋮ | | |

FIG. 6

| SHOP ID | SHOP NAME | ADDRESS | DETERMINATION DISTANCE INFORMATION |
|---|---|---|---|
| ⋮ | ⋮ | ⋮ | ⋮ |

FIG. 7

SHOP ID : 00003

SHOP ID : 00002

SHOP ID : 00001

| STAYING PERSON HEADCOUNT | DETERMINATION DISTANCE |
|---|---|
| 0 ~ 10 | 300M |
| 11 ~ 20 | 200M |
| ⋮ | ⋮ |

FIG. 18
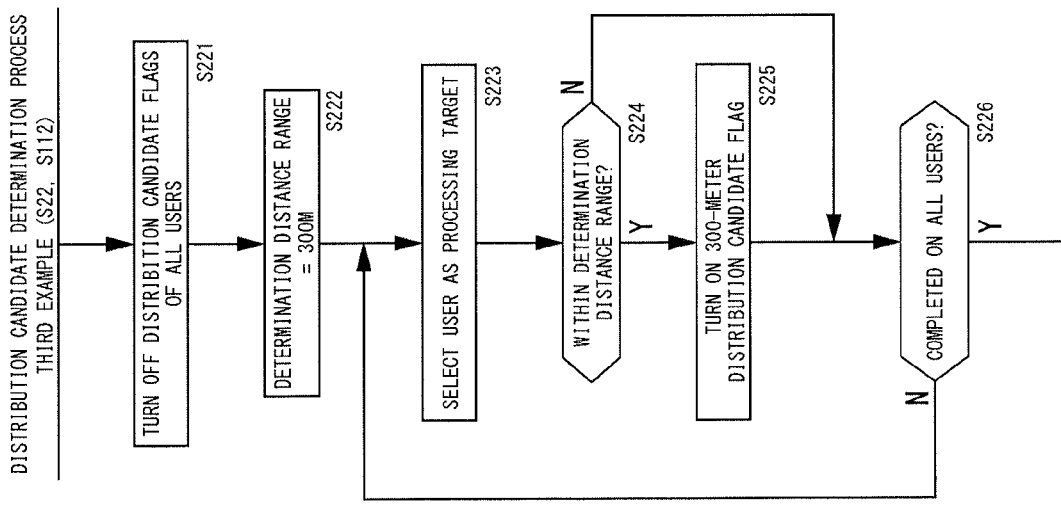
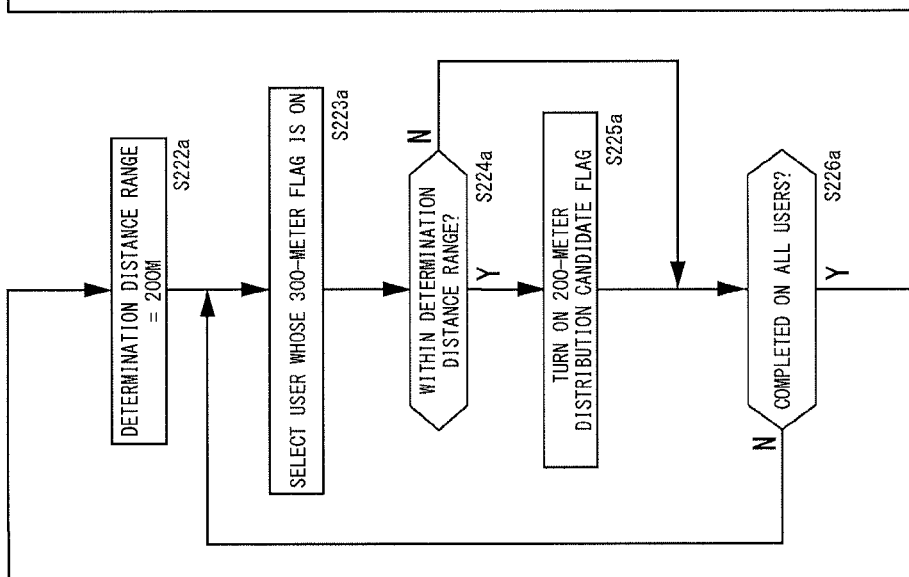
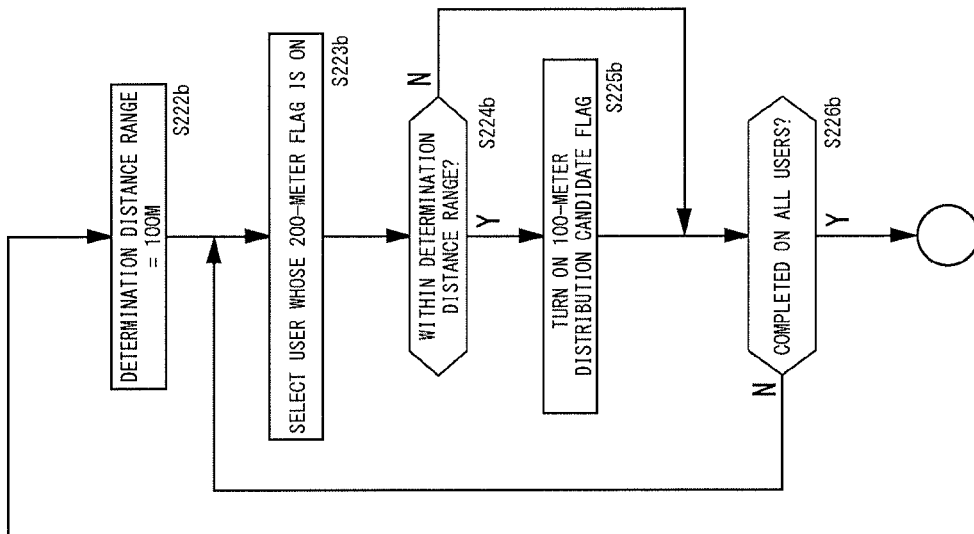

FIG. 19

```
                                                            20c
┌─────────────────────────────────────────────────────────┐
│                                                         │
│        DISTRIBUTION TARGET PERSON HEADCOUNT             │
│                                                         │
│                        DISTRIBUTION TARGET PERSON       │
│     DISTANCE FROM SHOP          HEADCOUNT               │
│                                                         │
│          100M          -         50                     │
│                                                         │
│─ ─ ─ ─ ─ ─ ─ ─ ─ ─ ─ ─ ─ ─ ─ ─ ─ ─ ─ ─ ─ ─ ─ ─ ─ ─ ─ ─ │
│                                                         │
│   PERSONS LOCATED WITHIN RADIUS                         │
│   OF 100 METERS AROUND SHOP                             │
│                                                         │
│   GENDER         PROFESSION                             │
│  ┌──────────┐  ┌────────────────────────┐ ┌──────────┐  │
│  │MALE  —40 │  │COMPANY EMPLOYEE—40     │ │ RE-INPUT │  │
│  │FEMALE—30 │  │HOUSEWIFE        —15    │ └──────────┘  │
│  │          │  │STUDENT          —10    │ ┌──────────┐  │
│  │    ⋮     │  │OTHERS           —5     │ │  DECIDE  │  │
│  └──────────┘  └────────────────────────┘ └──────────┘  │
└─────────────────────────────────────────────────────────┘
```

INFORMATION PROCESSING DEVICE, INFORMATION PROCESSING METHOD, PROGRAM, AND STORAGE MEDIUM

TECHNICAL FIELD

The present disclosure relates to an information processing device, an information processing method, and a storage medium.

CITATION LIST

Patent Literature

Patent Literature 1: JP 2010-225090 A

BACKGROUND ART

Electronic coupon distribution systems have been known which allow distribution target persons to select a desired coupon beforehand, and subsequently distribute the selected coupon to the distribution target persons. The above-cited Patent Literature 1 discloses a method which, based on global positioning system (GPS) information about member terminals, extracts a predetermined number of target member terminals in ascending order of distance from a shop so that coupons may be distributed from the shop to the extracted member terminals.

SUMMARY OF INVENTION

Technical Problem

However, even if information is distributed uniformly in ascending order of distance, the distribution may not necessarily be useful. It is thus desired that the distribution information be transmitted in a more flexible manner to user terminals owned by the users to whom the distribution of the information is deemed more useful.

Solution to Problem

An information processing device as one embodiment of the present disclosure includes a distribution target determination unit configured to determine that a terminal located within a first predetermined range and detected by a first detection technique is a first distribution target terminal and that a terminal located within a second predetermined range and detected by a second detection technique is a second distribution target terminal, where the second predetermined range is included in the first predetermined range; a distribution request acquisition unit configured to acquire a distribution request from a distribution requester terminal; and an information distribution unit configured to distribute information corresponding to the distribution request to at least the first distribution target terminal, the first distribution target terminal not overlapping with the second distribution terminal, or the second distribution target terminal.

Because the different detection techniques are used to set the ranges for detecting the distribution target terminals, it is possible to determine the terminals in a manner taking advantage of the characteristics of each detection technique covering a specific terminal detection range. Also, because the multiple detection techniques are used to detect the terminals, fewer applicable terminals are overlooked.

The information processing device outlined above preferably determines that a terminal detected by the first detection technique and located within a third predetermined range wider than the first predetermined range is a third distribution target terminal. This allows more flexible setting of the range of detection suitable for the purpose of information distribution.

In the information processing device outlined above, the second detection technique is preferably a detection technique configured to use a communication system of which a signal has more difficulty in penetrating a wall than the first detection technique.

Using such second detection technique permits more accurate detection of the number of terminals inside the premises (e.g., shop).

In the information processing device outlined above, the distribution target determination unit preferably determines that, of the terminals estimated to be located within the first predetermined range, a terminal whose user is applicable to an attribute condition acquired from the distribution requester terminal is the first distribution target terminal and that, of the terminals estimated to be located within the second predetermined range, a terminal whose user is applicable to the attribute condition acquired from the distribution requester terminal is the second distribution target terminal.

This allows the distribution requester to ascertain easily the number of terminals owned by the users who have the attributes desirable for distribution and who are located around the premises (e.g., shop).

The information processing device outlined above preferably further includes a calculation unit configured to calculate the number of the first distribution target terminals and the number of the second distribution target terminals; and a presentation control unit configured to cause the distribution requester terminal to present the number of the first distribution target terminals and the number of the second distribution target terminals.

This allows a staff member (distribution requester) of the premises (e.g., shop) to ascertain the proportion of the persons having an attribute other than the attribute corresponding to the attribute condition selected by the staff member.

An information processing method as an embodiment of the present disclosure performed by an information processing device, includes the following steps. It is determined that a terminal located within a first predetermined range and detected by a first detection technique is a first distribution target terminal and that a terminal located within a second predetermined range and detected by a second detection technique is a second distribution target terminal, where the second predetermined range is included in the first predetermined range. A distribution request is acquired from a distribution requester terminal. Information corresponding to the distribution request is distributed to at least the first distribution target terminal, the first distribution target terminal not overlapping with the second distribution terminal, or the second distribution target terminal.

This method implements the information processing device that uses the different detection techniques to set the ranges for detecting the distribution target terminals, thereby determining the terminals in a manner taking advantage of the characteristics of each detection technique covering a specific terminal detection range.

A program as an embodiment of the present disclosure causes an information processing device to perform a process including the above-described steps constituting the information processing method outlined above.

A storage medium as an embodiment of the present disclosure stores the above-mentioned program. The program and the storage medium serve to implement the information processing device outlined above.

Advantageous Effects of Invention

According to the present disclosure, different detection techniques are used to set the ranges for detecting the distribution target terminals, which makes it possible to determine the terminals in a manner taking advantage of the characteristics of each detection technique covering a specific terminal detection range. This permits determination of the locations of user terminals with more accuracy and flexibility.

BRIEF DESCRIPTION OF DRAWINGS

FIG. 4 is a schematic view explanatory of a portion of information stored in a user database of the embodiment;

FIG. 5 is a schematic view explanatory of a portion of information stored in a location database of the embodiment;

FIG. 6 is a schematic view explanatory of a portion of information stored in a shop database of the embodiment;

FIG. 7 is a schematic view explanatory of a portion of information stored in a determination distance database of the embodiment;

FIG. 18 is a flowchart showing a third example of the distribution candidate determination process performed by the embodiment;

FIG. 19 is a schematic view explanatory of another presentation screen presented on the user terminal of the embodiment;

DESCRIPTION OF EMBODIMENTS

Figure 1:
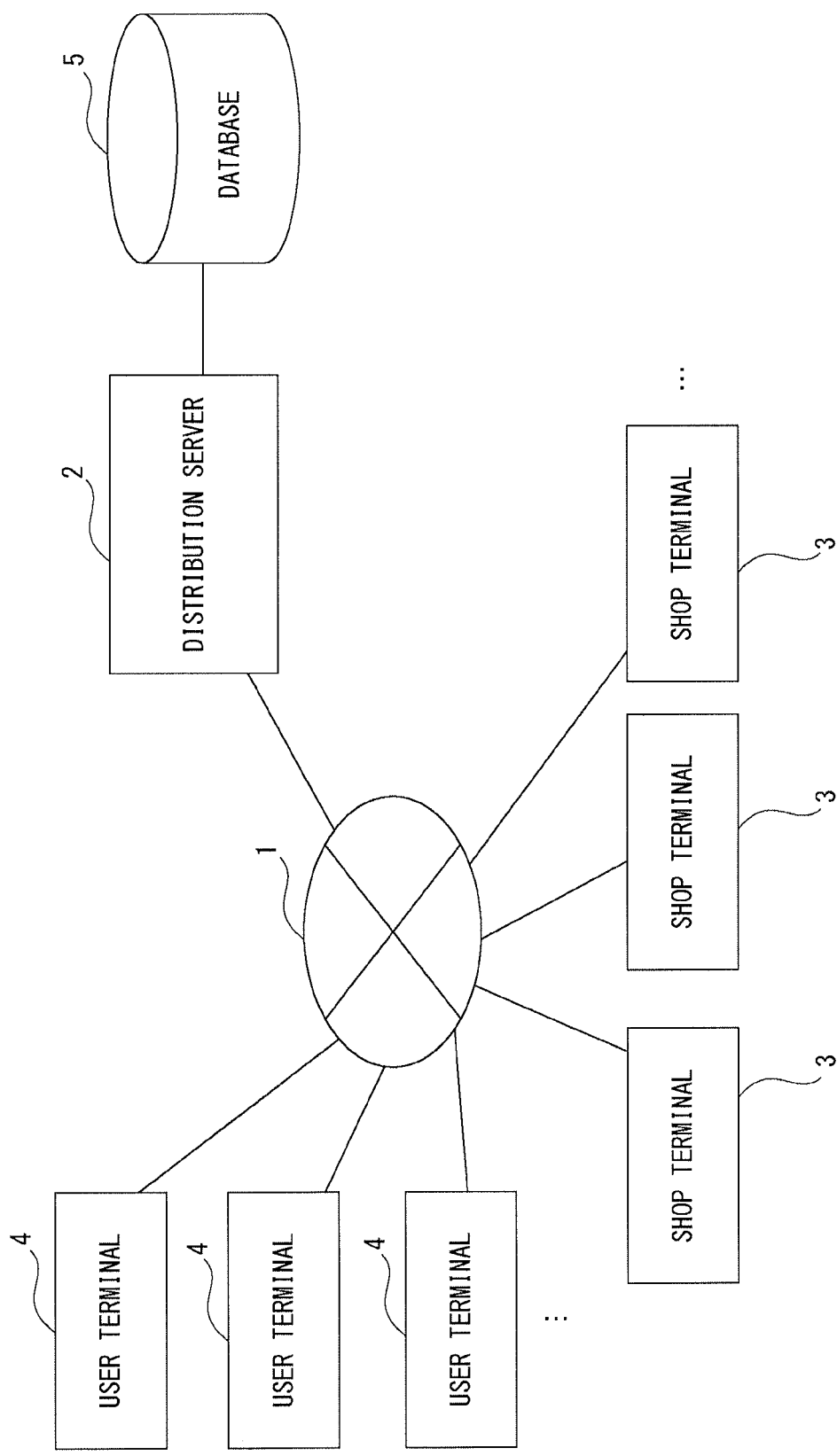
FIG. 1 is a schematic view explanatory of a typical configuration of a network system as one embodiment of the present disclosure.

Some preferred embodiments of the present disclosure are described below under the following headings:
1. Overall Configuration
2. Functional Configuration of Server and Databases
2-1. Functional Configuration of Server
2-2. Databases
3. Outline of Presentation Screens on Shop Terminal
4. Processing Performed by User Terminal
5. Processing for Distribution of Coupons
5-1. Overall Processing
5-2. Processing Performed by Distribution Server
6. Variations and Other Working Examples
6-1. Second Example of Distribution Candidate Determination Process
6-2. Third Example of Distribution Candidate Determination Process
6-3. Second Example of Processing Performed by Distribution Server
6-4. Third Example of Processing Performed by Distribution Server
7. Conclusion
8. Program and Storage Medium
9. Second Embodiment
10. Third Embodiment
11. Conclusion
12. Program and Storage Medium 1. Overall Configuration FIG. 1 shows an example configuration of a network system according to the embodiments. In the embodiments, the network system functions as an electronic coupon distribution system that distributes electronic coupons using a network. A distribution server included in FIG. 1 constitutes an information processing device as part of the embodiment.

In the description that follows, the term "electronic coupon" will be simply referred to as "coupon."

In connection with the embodiments, the shop manager (e.g., a staff member or the proprietor of the shop) will be cited as an example of a distribution requester, and the shop terminal used by the shop manager will be cited as an example of a distribution requester terminal.

The term "distribution target person" refers to the person selected from the general public (i.e., users) as the target person to whom the coupon is to be distributed. The term "user terminal" refers to the terminal via which the general user receives the coupon.

As shown in FIG. 1, the network system according to the embodiments includes a distribution server 2, multiple shop terminals 3, and multiple user terminals 4 interconnected in a manner mutually communicable via a network 1. The distribution server 2 is allowed to access database 5.

In the ensuing description, a "database" will be referred to as a "DB."

The network 1 may be configured in many variations, such as the Internet, an intranet, an extranet, a local area network (LAN), a community antenna television (CATV) communication network, a virtual private network, a telephone network, a mobile communication network, or a satellite communication network.

The transmission medium that constitutes part or all of the network 1 may be implemented also in many variations, e.g., in a wired manner using Institute of Electrical and Electronics Engineers (IEEE) 1394 connections, universal serial bus (USB) connections, power line carriers, or telephone lines; or in a wireless manner using infrared light such as the infrared data association (IrDA), Bluetooth (registered trademark), 802.11 wireless, a mobile telephone network, a satellite channel, a terrestrial digital broadcasting network, or the like.

The distribution server 2 is a server that distributes the coupon to the distribution target persons selected from the general users. For example, the distribution server 2 selects as the distribution target person a user corresponding to the attribute condition desired by the shop manager for distribution, the distribution server 2 distributes the coupon to the selected distribution target person.

The distribution server 2 performs processing based on a processing request received from the shop terminal 3 or from the user terminal 4. For example, the distribution server 2 performs a process of transmitting to the shop terminal 3 the information constituting an attribute condition input screen, a process of transmitting to the shop terminal 3 the information constituting a screen for presenting the number of distribution target persons, a process of transmitting to the shop terminal 3 the information constituting a coupon content input screen, a process of distributing the coupon to the user terminal 4, a process of receiving location information and other information from the user terminal 4, a process of shop management, and a process of distribution target person management, or the like.

The shop terminal 3 is an information processing device operated by the shop manager who requests distribution of the coupon to the distribution target persons by use of a coupon distribution service. Specifically, the shop terminal 3 is a computer device installed in a shop, or a portable or non-portable information processing device for use by the shop manager.

Each shop terminal 3 performs a process of presenting on a presentation unit the attribute condition input screen or a headcount presentation screen provided by the distribution server 2.

The user terminal 4 is an information processing device for use by a distribution target person. Each user terminal 4 acquires from the distribution server 2 the information constituting a coupon content screen that presents the content of the coupon. Each user terminal 4 further acquires its own location information and transmits the acquired information to the distribution server 2. The user terminal 4 is implemented using, for example, a personal computer (PC) equipped with a communication function, a feature phone, a personal digital assistant (PDA), or a smart device such as a smartphone or a tablet terminal. For the present embodiment, the user terminal 4 is assumed to be a portable terminal carried around by the user.

In the present embodiments, at the distribution server 2, a hypertext transfer protocol (HTTP) daemon is activated, for example. At the shop terminal 3, a browser is activated, and a processing request (HTTP request) is transmitted from the shop terminal 3 to the distribution server 2 via the browser. The distribution server 2 transmits to the shop terminal 3 a processing result (HTTP response) corresponding to the processing request. For example, page data written in webpage description language is transmitted to the shop terminal 3. On the basis of the page data, webpages (screens) reflecting the processing result are presented to a presentation control unit of the shop terminal 3.

Operating in this manner, the distribution server 2 transmits attribute condition input screen information (i.e., webpage data constituting the attribute condition input screen) and headcount presentation screen information (i.e., webpage data constituting a headcount presentation screen) to the shop terminal 3, and performs processing to meet the requests from the shop terminal 3. The distribution server 2 further causes the user terminal 4 to present a coupon presentation screen by similar operation.

The webpage data mentioned above are made up of structured document files in hypertext markup language (HTML) or in extensible hypertext markup language (XHTML), for example. Described in the structured document files are text data such as an article, image data constituting an image attached to the article, and the layout and presentation mode regarding such data (e.g., text color, font, sizes, and ornaments).

The DB 5 generically indicates the databases that store information needed by the distribution server 2 to distribute the coupon to the distribution target person. The DB 5 will be discussed later in more detail.

Figure 2:
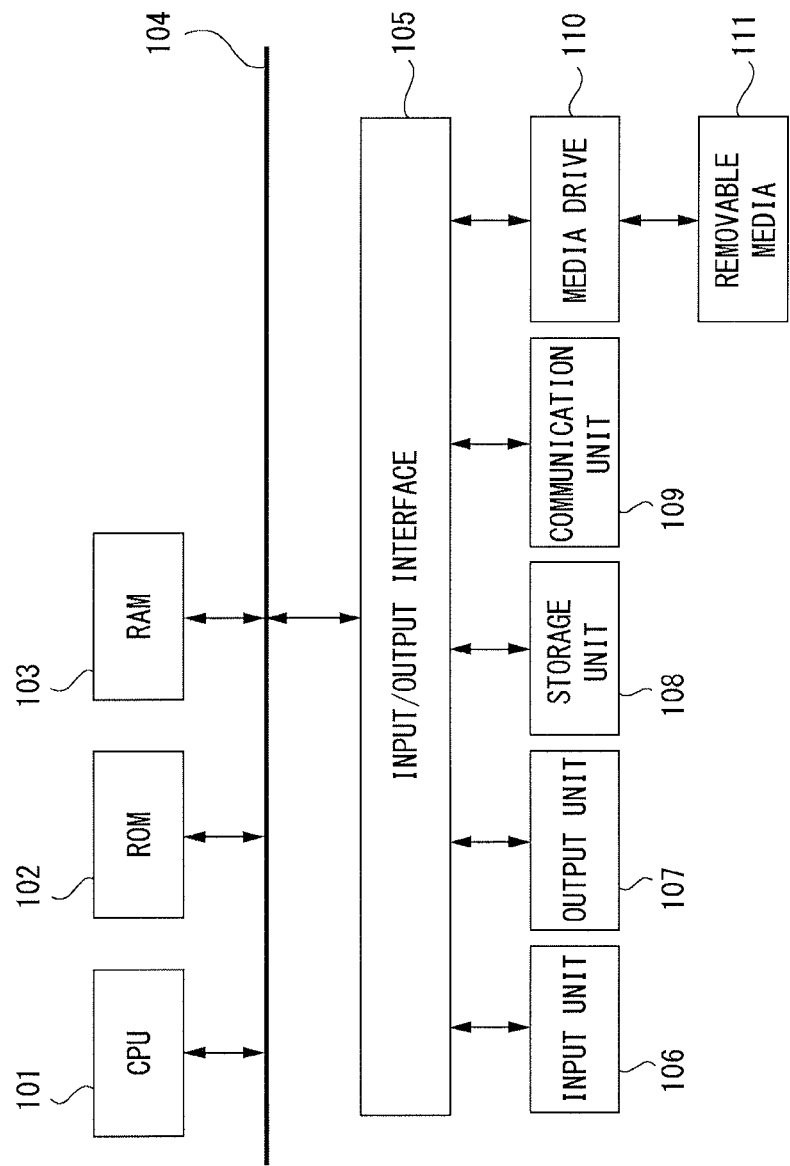
FIG. 2 is a schematic view explanatory of a hardware configuration of the embodiment.

Described below, as shown in FIG. 2, is a hardware configuration of the information processing device constituting each of the distribution server 2, the shop terminal 3, the user terminal 4, and the DB 5 indicated in FIG. 1. The distribution server 2, the shop terminal 3, the user terminal 4, and the DB 5 may be each implemented in the form of a computer device capable of information processing and information communication as depicted in FIG. 2.

In FIG. 2, a central processing unit (CPU) 101 of the computer device performs various processes in accordance with programs stored in a read-only memory (ROM) 102 or in accordance with programs loaded into a random access memory (RAM) 103 from a storage unit 108. The RAM 103 may also store data as needed for the CPU 101 to perform the diverse processing.

The CPU 101, the ROM 102, and the RAM 103 are connected with one another via a bus 104. The bus 104 is also connected with an input/output interface 105.

The input/output interface 105 is connected with an input unit 106 including a keyboard, a mouse, a touch panel, or the like; an output unit 107 including, for example, a speaker and a display such as a liquid crystal display (LCD), a cathode ray tube (CRT), or an organic electroluminescence (EL) panel; a storage unit 108 including a hard disk drive (HDD), a flash memory device, or the like; and a communication unit 109 that performs communication processing via the network 1 as well as device-to-device communication.

The input/output interface 105 is further connected as needed with a media drive 110. The media drive 110 is loaded as needed with removable media 111 such as a magnetic disk, an optical disk, a magneto-optical disk, or a semiconductor memory. The media drive 110 writes and reads information to and from the loaded piece of removable media 111.

The computer device configured as described above uploads and downloads data and programs through communication via the communication unit 109, and distributes data and programs through the removable media 111.

When the CPU 101 performs processing operations on the basis of various programs, information processing or communication necessary for the distribution server 2, the shop terminal 3, the user terminal 4, and the DB 5 is carried out.

Incidentally, the information processing device constituting the distribution server 2, shop terminal 3, user terminal 4, or the DB 5 need not be configured with a single computer device such as is shown in FIG. 2. Alternatively, the information processing device may be configured as a system made up of multiple computer devices. As another alternative, the multiple computer devices may be configured as a system using a LAN, for example. As a further alternative, the computer devices may be located remotely in a communicable manner using a virtual private network (VPN) implemented on the Internet, for example.

2. Functional Configuration of Server and Databases

2-1. Functional Configuration of Server

Figure 3:
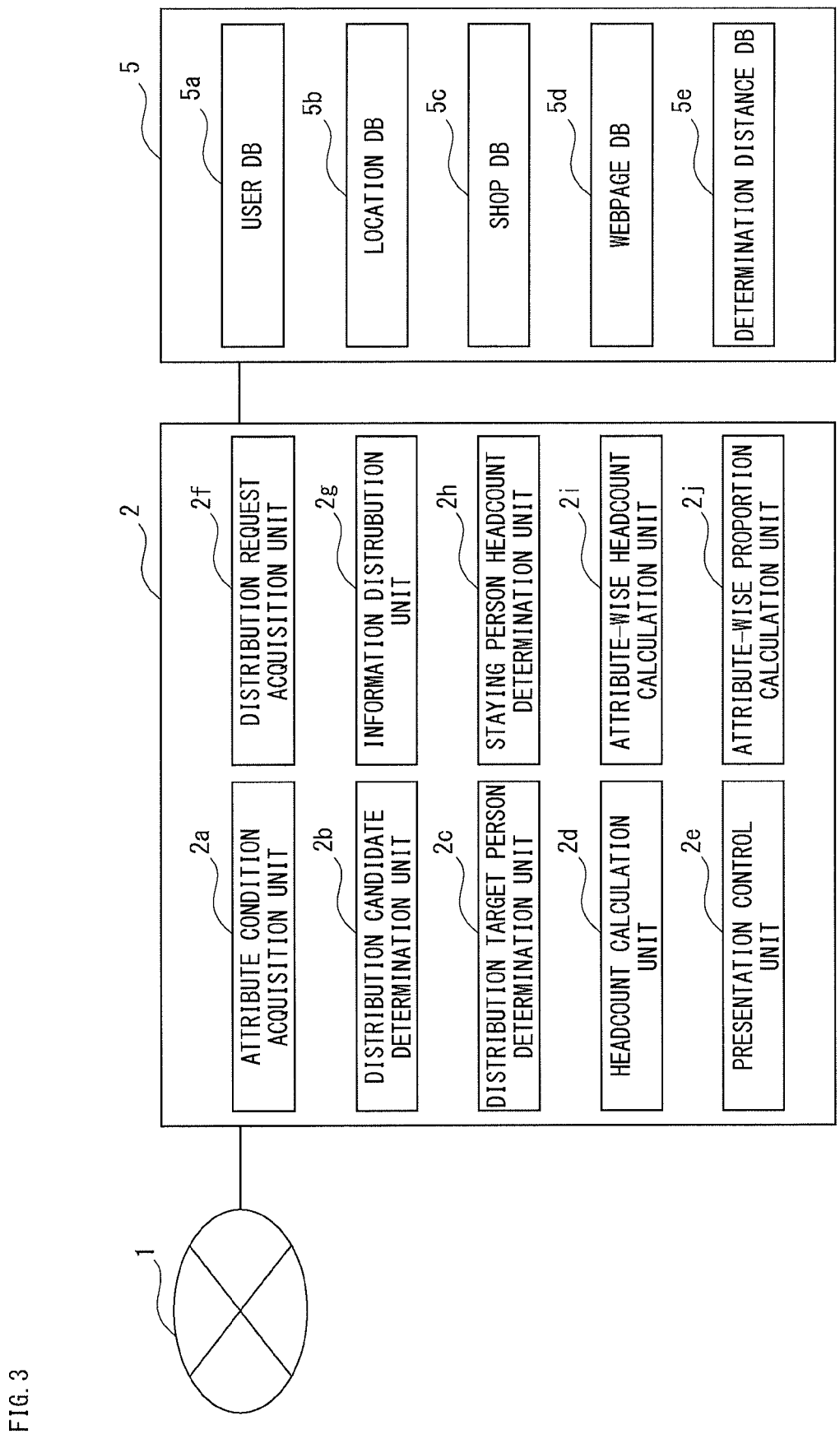
FIG. 3 is a schematic view explanatory of a distribution server of the embodiment.

FIG. 3 shows a functional configuration of the distribution server 2 implemented by one or a plurality of information processing devices.

Each function of the distribution server 2 is implemented by processes performed by the CPU 101 of the information processing device in accordance with programs. Alternatively, part or all of the processes representing the functions to be discussed below may be implemented by hardware.

When implemented by software, each function need not be realized by a separate program. Alternatively, a single program may implement multiple functions, or a single function may be implemented by multiple program modules working in coordination with each other.

The distribution server 2 includes an attribute condition acquisition unit 2a, a distribution candidate determination unit 2b, a distribution target person determination unit 2c, a headcount calculation unit 2d, a presentation control unit 2e, a distribution request acquisition unit 2f, an information distribution unit 2g, a staying person headcount determination unit 2h, an attribute-wise headcount calculation unit 2i, and an attribute-wise proportion calculation unit 2j.

The attribute condition acquisition unit 2a acquires an attribute condition of a distribution target person from the shop terminal 3. The attribute condition is used as a condition for identifying the distribution target person to whom the shop manager desires to distribute the coupon. Specifically, the attribute condition acquisition unit 2a receives from the shop terminal 3 attribute condition information input by the shop manager operating the shop terminal 3. For example, if the shop manager inputs attribute conditions "male," "in the twenties," and "company employee," these attribute conditions are transmitted from the shop terminal 3 to the attribute condition acquisition unit 2a.

The distribution candidate determination unit 2b determines as a distribution candidate the person located within the range of a predetermined distance from the premises corresponding to the shop terminal 3. Specifically, the distribution candidate determination unit 2b determines a distribution candidate by acquiring the location information of a user from a location DB 5b and extracting the user located within the range of a predetermined distance from the premises (shop). The distribution candidate refers to the user located within the predetermined distance range for candidate determination. A distribution candidate determination process will be discussed later in detail.

It is assumed that the premises (shop) corresponding to the shop terminal 3 serving as the distribution requester terminal are the premises (shop or other facilities) found registered in association with an identification (ID) of the shop manager or the ID of the shop terminal 3 when the shop manager using the shop terminal 3 logs in to the service provided by the distribution server 2. That is, the shop of which the location is identified when the shop manager logs in is assumed to be "the premises (shop) corresponding to the shop terminal 3."

The distribution target person determination unit 2c determines as the distribution target person the distribution candidate who corresponds to the attribute condition. Specifically, the distribution target person determination unit 2c refers to the attribute information of the distribution candidate acquired from a user DB 5a and the attribute condition information received from the shop terminal 3. The distribution target person determination unit 2c then determines the attribute candidate having the attribute information received from the shop terminal 3 is the distribution target person. For example, if the shop manager has input the attribute information "male," "in the twenties," and "company employee" to the shop terminal 3, the distribution target person determination unit 2c determines the attribute candidate having the attribute information "male," "in the twenties," and "company employee" as the distribution target person.

The headcount calculation unit 2d calculates the number of distribution target persons. Specifically, the headcount calculation unit 2d calculates the number of the distribution target persons determined by the distribution target person determination unit 2c.

The presentation control unit 2e generates diverse webpage data (i.e., HTML data) constituting the coupon distribution system. For example, the presentation control unit 2e generates such webpage data as target person headcount screen information for presenting the number of distribution target persons and coupon content screen information.

The distribution request acquisition unit 2f acquires a distribution request from the shop terminal 3. Specifically, the distribution request acquisition unit 2f receives from a given shop terminal 3 the coupon information input by the shop manager to the shop terminal 3. For example, the distribution request acquisition unit 2f receives from the shop terminal 3 the content of the coupon the shop manager desires to distribute, where the content of the coupon may contain an offer such as "30% discount for all the items, available only today, available only for those receiving this coupon."

The coupon information requested to be distributed by the shop terminal 3 may represent the content of an unedited coupon or the content of an edited coupon ready to be distributed.

The information distribution unit 2g transmits the coupon content information to the user terminal 4 of the distribution target person. Specifically, the information distribution unit 2g generates information that includes a coupon image such as email information by generating the coupon image according to the coupon content received by the distribution request acquisition unit 2f or by acquiring from a webpage DB 5d the coupon image corresponding to the received coupon content, for example. Then, the information distribution unit 2g transmits the generated information to the user terminal 4.

The staying person headcount determination unit 2h determines the number of persons staying in the shop, i.e., the number of customers inside the shop. It is not always necessary to determine the exact number of the staying persons.

The attribute-wise headcount calculation unit 2i calculates an attribute-wise headcount for each attribute. The attribute-wise headcount is, for example, the number of distribution candidates having a certain attribute among the distribution candidates, where the distribution candidates are those determined as the persons staying near the shop.

The attribute-wise proportion calculation unit 2j calculates an attribute-wise proportion for each attribute. The attribute-wise proportion is, for example, a proportion of distribution candidates having a certain attribute to the distribution candidates, where the distribution candidates are those determined as the persons staying near the shop.

2-2. Databases

Described blow is the DB 5 used by the distribution server 2 with the above-mentioned functions in determining the distribution candidate and distribution target person, in presenting the distribution content to the user terminal 4, or in performing like operations.

The DB 5 includes, for example, a user DB 5a, a location DB 5b, a shop DB 5c, a webpage DB 5d, and a determination distance DB 5e; The user DB 5a stores data about the user terminal 4 and data about the user owning the user terminal 4. The location DB 5b stores location information about the user terminal 4 and the like. The shop DB 5c stores data about the shop terminal 3 and about the shop. The webpage DB 5d stores diverse webpage data to be presented to the shop terminal 3 and to the user terminal 4. And the determination distance DB 5e that stores data about a predetermined distance corresponding to the numbers of customers staying in the shop. Obviously, the DB 5 may be configured to include other databases needed by the distribution server 2 to function on the Internet.

The user DB 5a stores the data about each user who makes use of the coupon distribution service and owns the user terminal 4, as shown in FIG. 4. For example, a user ID as identification information about each user is stored in association with the browsing history information, an address, a name, and attribute information such as gender and age, as well as an email address and the like.

The attribute information is not limited to gender, age, and occupation. Diverse attribute information such as about hobby, favorite food, and personality may also be stored as attribute conditions.

Each user registered in the user DB 5a may, for example, be the user registered to receive the coupon distribution service or the like provided by the distribution server 2. A user ID is then assigned in accordance with the registration.

The location DB 5b is a database in which the current location of each user is registered. For example, as shown in FIG. 5, each user ID is stored in the location DB 5b in association with location information, the reception date and time at which the location information was received, a distribution candidate flag, and a distribution target person flag, and the like.

For example, every time location information is received from a user terminal 4, the distribution server 2 updates the location information and the date and time of reception in association with the user ID corresponding to the user terminal 4. That is, the distribution server 2 receives portable terminal location information as the location information about each user, and updates the location DB 5b in accordance with the received portable terminal location information. The portable terminal location information refers to the location information about the portable user terminal 4 carried around by each user. The location information includes latitude and longitude information.

Each user terminal 4 thus acquires a beacon ID from a beacon and GPS location information from GPS, and transmits the acquired information to the distribution server 2. Given the information, the distribution server 2 identifies the location information.

For example, where GPS location information is used, each user terminal 4 acquires latitude and longitude information constituting its current location from the information received, for instance, periodically by a GPS receiver. The user terminal 4 transmits the acquired information to the distribution server 2.

Where a beacon is used, a user terminal 4 acquires a beacon ID, when located within a specific range of the beacon. The user terminal 4 transmits the acquired beacon ID to the distribution server 2. The distribution server 2 having received the beacon ID acquires the location information in accordance with the beacon ID.

Each distribution candidate flag stored in the location DB 5b indicates whether or not the corresponding user is determined as a distribution candidate in the distribution candidate determination process, to be discussed later. Specifically, based on the portable terminal location information, the distribution server 2 determines as a distribution candidate each user located within the range of a predetermined distance from the premises corresponding to the shop terminal 3.

Each distribution target person flag indicates whether or not the corresponding user is determined as a distribution target person by a distribution target person determination process, to be discussed later.

The shop DB 5c stores, as shown in FIG. 6, the data about each shop desirous of distributing coupons to users. For example, data stored for each shop include a shop ID as shop identification information, shop name, an address, a telephone number, link information such as uniform resource locator (URL) providing a link to the webpage of the shop, and determination distance information designating the range of distances from the shop for determining the distribution candidate.

The shop ID of each shop is corresponding to the shop manager, for example by being associated with the login ID of the shop manager.

The webpage DB 5d stores various webpage data constituting the coupon distribution service in association with the link information (URL) about the webpages. For example, the webpage DB 5d stores the webpage data about login screens, webpage data about websites, attribute input screen information, headcount presentation screen information, coupon screen information, and the like.

The determination distance DB 5e, as shown in FIG. 7, stores staying person headcount information and determination distance information corresponding to the headcounts for each shop ID. The distribution server 2 causes the determination distance DB 5e to store the distance determination information, when the shop manager requests for registration in advance, operating the shop terminal 3.

The determination distance information is not limited to those set by each shop manager performing the registration operation as described above. Alternatively, the distribution server 2 may decide on the determination distance information in advance.

The DB 5 including the above-described databases may be configured in a server computer separate from the distribution server 2 or inside the distribution server 2.

Although the user DB 5a, the location DB 5b, the shop DB 5c, the webpage DB 5d, and the determination distance DB 5e were described above as constituting the DB 5 for illustrative and explanatory purposes, these databases may be implemented in any form as long as they are accessible by the distribution server 2. For example, all the databases may be configured in a storage unit of the same system that includes the distribution server 2. Alternatively, some or all of the databases may be configured in a separate computer system or in a remotely located computer system. Obviously, each database need not be configured in a single device (such as a single HDD). Also, each database need not be configured as a single database. For example, the information stored in the user DB 5a may be stored in and managed by multiple distribution target person databases (e.g., a distribution target person DB for login purposes and a distribution target person DB for transaction purposes). Each of the above databases, which will be described later in conjunction with the embodiments, is illustrated as an individual DB, simply as an example configuration of a storage unit that stores the information related to the processing performed by the embodiments.

3. Outline of Presentation Screens on Shop Terminal

Figure 8:
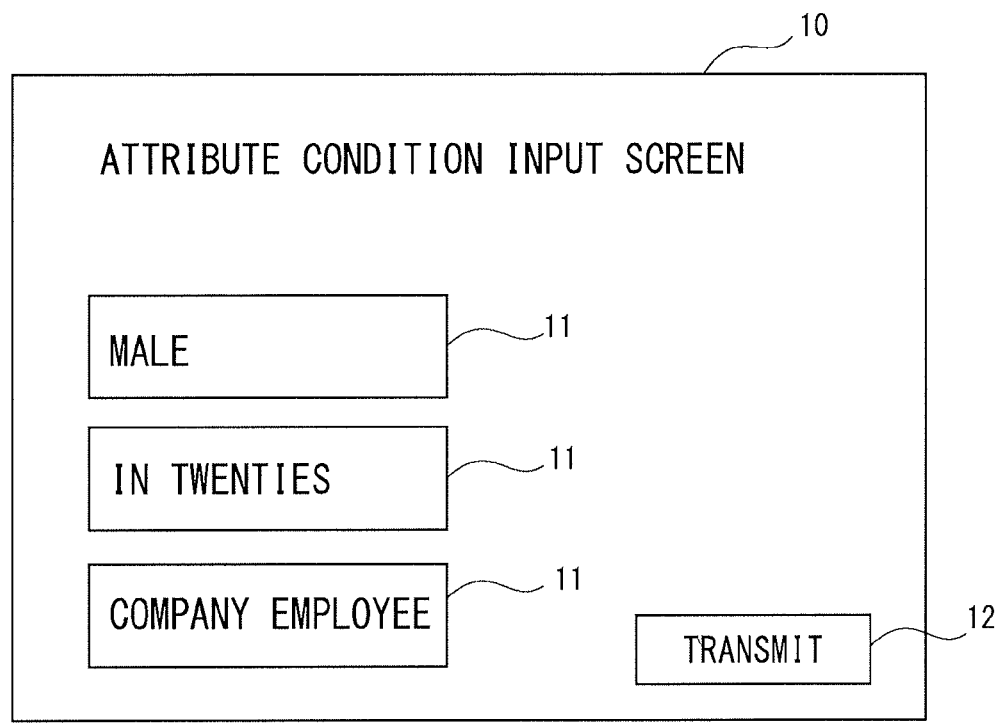
FIG. 8 is a schematic view explanatory of a presentation screen presented on a user terminal of the embodiment.
Figure 9:
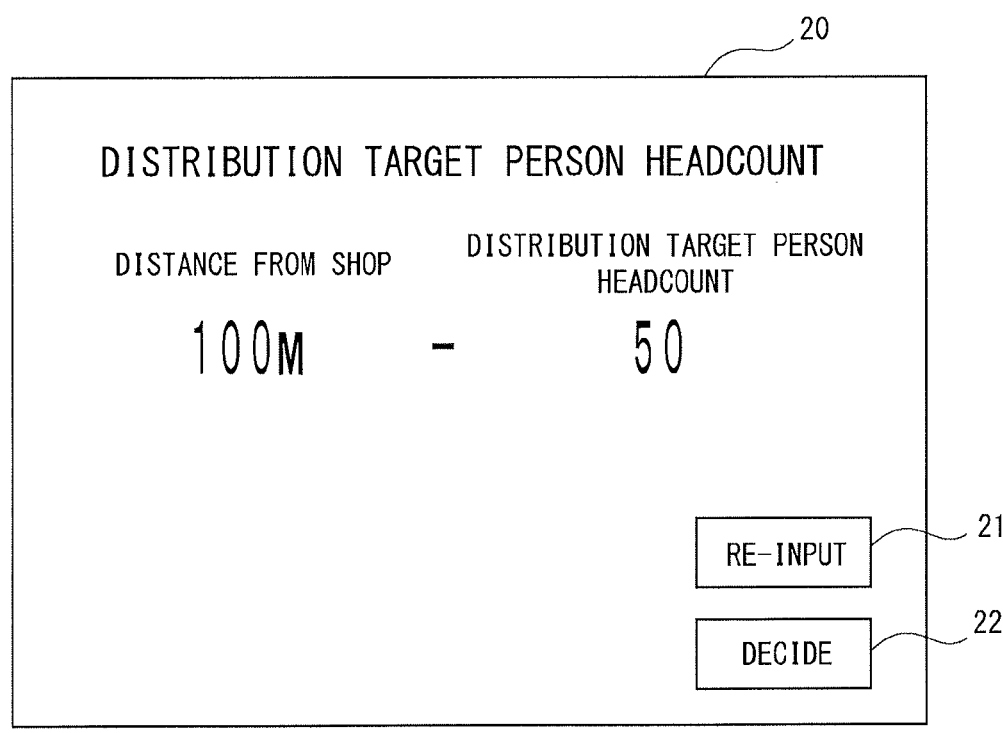
FIG. 9 is a schematic view explanatory of another presentation screen presented on the user terminal of the embodiment.
Figure 10:
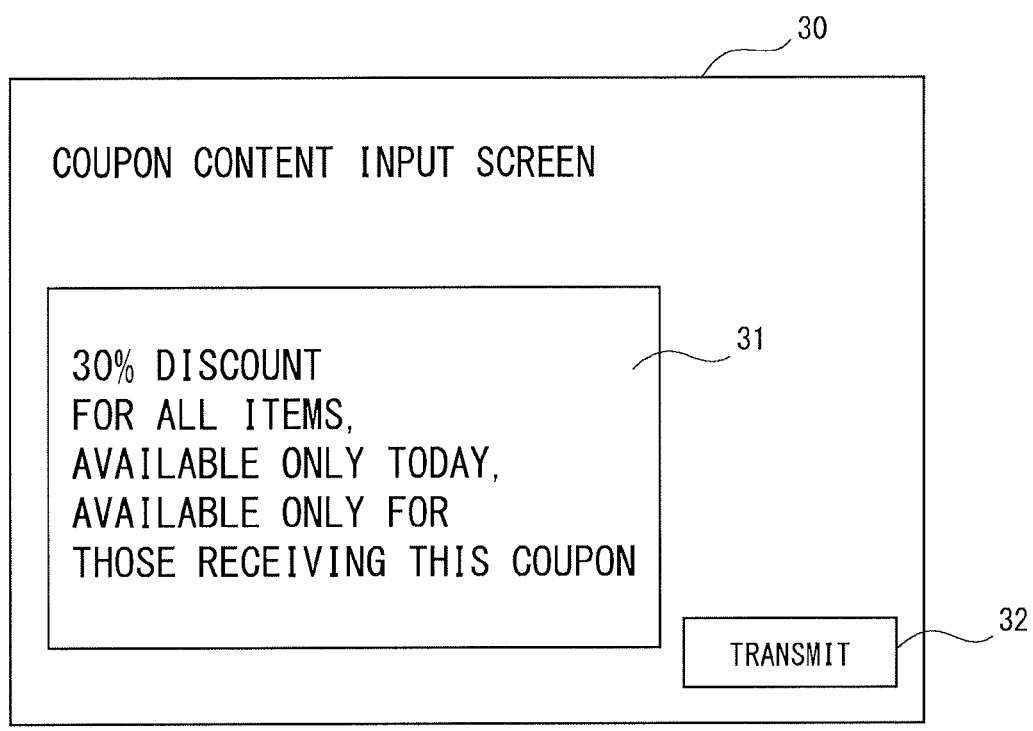
FIG. 10 is a schematic view explanatory of another presentation screen presented on the user terminal of the embodiment.

Described below with reference to FIGS. 8 to 10 are examples of screens presented on the shop terminal 3 by the distribution server 2 when a given shop in the embodiments utilizes the coupon distribution system.

On the shop terminal 3, as shown in FIG. 8, an attribute condition input screen 10 is presented as the screen to which the shop manager inputs an attribute condition.

The attribute condition input screen 10 includes multiple attribute input areas 11 to which attribute condition information is input, and an attribute transmission button 12 for transmitting the attribute condition for the distribution target person to the distribution server 2.

The shop manager inputs to the multiple attribute input areas 11 the attribute conditions for the person to whom the shop manager desires to distribute the coupon, by operating the terminal (e.g., with touches, clicks, and keyboard manipulations). For example, the shop manager inputs such attribute conditions as "male," "in the twenties," and "company employee" to the multiple attribute input areas 11. The input of the attribute conditions may be accomplished using pull-down menus, for example. From the items presented in the pull-down menus, the shop manager may select the desired attribute conditions.

The attribute transmission button 12 is operated by the shop manager to transmit the attribute condition when the input is completed.

Though not shown in the figure, there may be provided a determination distance range input area for use in determining distribution candidates, so that the shop manager can personally set the determination distance range in the attribute input screen. This makes it possible for the shop manager to know with ease the number of distribution target persons located within the range of the distance of interest, thereby improving convenience for the shop manager.

On the shop terminal 3, as shown in FIG. 9, the number of distribution target persons is presented in a headcount presentation screen 20. The headcount presentation screen 20 indicates, for example, that there are 50 distribution target persons located within a radius of 100 meters around the shop.

The headcount presentation screen 20 includes a re-input button 21 and a target decision button 22. The re-input button 21 is operated by the shop manager to transmit the attribute condition again. The target decision button 22 is operated by the shop manager to decide on the distribution target persons.

The re-input button 21 is operated by the shop manager when the shop manager desires to input the attribute information again because the number of distribution target persons was found to be smaller than expected, for example. Operating this button allows the shop manager to input the attribute conditions repeatedly until a distribution target person headcount deemed acceptable is acquired.

The target decision button 22 is operated by the shop manager when, finding the distribution target person headcount to be acceptable, the shop manager proceeds to input the coupon content. That is, the shop manager verifies the number of the distribution target persons who correspond to the designated attributes and who are located within the range of a specific distance around the shop. Following the verification, the shop manager may decide to distribute the coupons to these persons. Then, the shop manager operates the target decision button 22.

On the shop terminal 3, as shown in FIG. 10, a coupon content input screen 30 is presented as the screen to which the coupon content is input.

The coupon content input screen 30 includes a content input area 31 to which the content of the coupon to be distributed is input, and a content transmission button 32 for transmitting to the distribution server 2 the coupon content to be distributed.

The coupon content input screen 30 is provided after the above-mentioned target decision button 22 is operated. The shop manager can consider the content of the coupon in view of the headcount displayed earlier on the headcount presentation screen 20. For example, if there are an insufficient number of distribution target persons corresponding to the input attribute conditions within the range of a predetermined distance, the shop manager may decide on a "30% discount"; if there are numerous applicable distribution target persons, the shop manager may decide on a "10% discount" instead. In this manner, the shop manager may flexibly consider the content of the coupon to be distributed in view of the number of target persons located around the shop.

The shop manager inputs to the content input area 31 the coupon content such as "30% discount for all the items, available only today, available only for those receiving this coupon." After the input, the shop manager operates the content transmission button 32 to transmit the coupon content from the shop terminal 3 to the distribution server 2.

When the content transmission button 32 is to be operated, a confirmation screen may be presented to the shop manager to reconfirm the attributes of the distribution target persons, the headcount, and the coupon content, for example. The shop manager may then definitively decide on the distribution, causing the information about the coupon content to be transmitted from the shop terminal 3 to the distribution server 2.

4. Processing Performed by User Terminal

Figure 11:
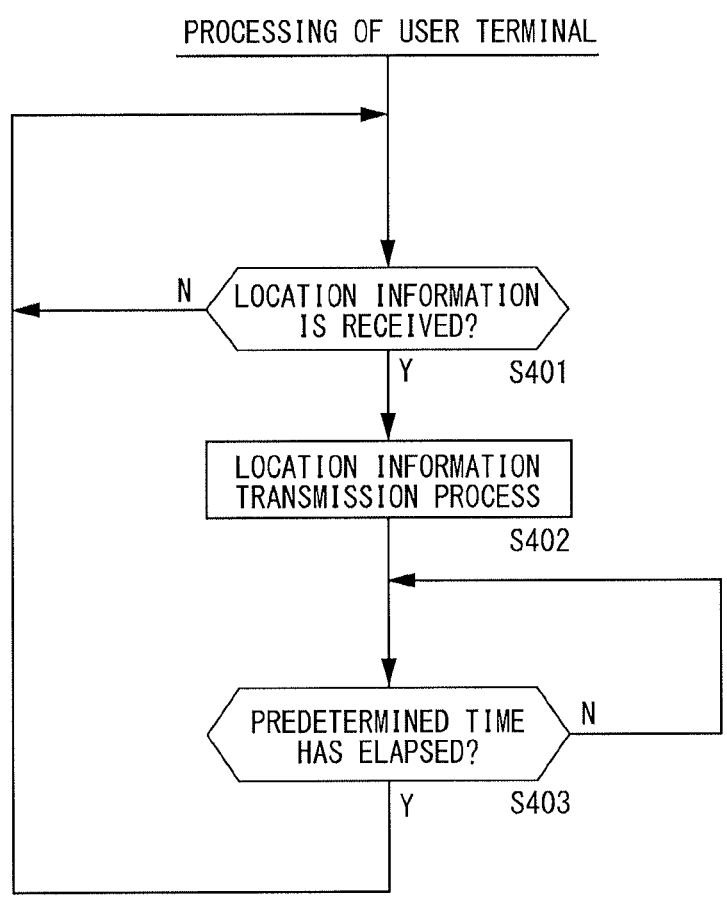
FIG. 11 is a flowchart showing processing performed by the user terminal of the embodiment.

Described below with reference to FIG. 11 is the processing performed by user terminal 4 to transmit user location information.

The user terminal 4 performs the processing shown in FIG. 11 to periodically transmit the current user location information to the distribution server 2.

First in step S401, the user terminal 4 performs a process of determining whether or not location information is received.

For example, the user terminal 4 acquires the current location information using the beacon, GPS information, or the like as discussed above.

If it is determined that the location information is not received, the user terminal 4 continues to perform the process of step S401.

If it is determined that the location information is received, the user terminal 4 passes control from step S401 to step S402. In step S402, the user terminal 4 performs a location information transmission process. For example, the user terminal 4 transmits the acquired location information such as latitude and longitude information to the distribution server 2 together with the user ID.

In response, the distribution server 2 updates the location DB 5*b*. That is, the distribution server 2 updates the location information corresponding to the received user ID and replaces the date and time of reception with the current date and time (i.e., at the time of reception).

The user terminal 4 then goes to step S403 to determine whether or not a predetermined time has elapsed since the location information transmission process was performed.

If it is determined that the predetermined time has elapsed since the location information transmission process was carried out, the user terminal 4 passes control from step S403 to step S401 and repeats the subsequent steps.

The predetermined time to elapse is not limited to any specific time period. For example, the time may be set to ten seconds, or to five minutes.

When the numerous user terminals 4 perform the above-described processing, the latest location information about each user is registered in the location DB 5*b*.

For example, each user terminal 4 may always perform the processing shown in FIG. 11 so long as an application software for receiving the service of the distribution server 2 is being activated.

5. Processing for Distribution of Coupons

Described below is an example of processing regarding the coupon distribution service offered by the distribution server 2. It will be explained below that the processing of the distribution server 2 is performed by the attribute condition acquisition unit 2*a*, the distribution candidate determination unit 2*b*, the distribution target person determination unit 2*c*, the headcount calculation unit 2*d*, the presentation control unit 2*e*, the distribution request acquisition unit 2*f*, the information distribution unit 2*g*, the staying person headcount determination unit 2*h*, the attribute-wise headcount calculation unit 2*i*, and the attribute-wise proportion calculation unit 2*j* shown in FIG. 3 and operating in coordination with each other.

5-1. Overall Processing

Figure 12:
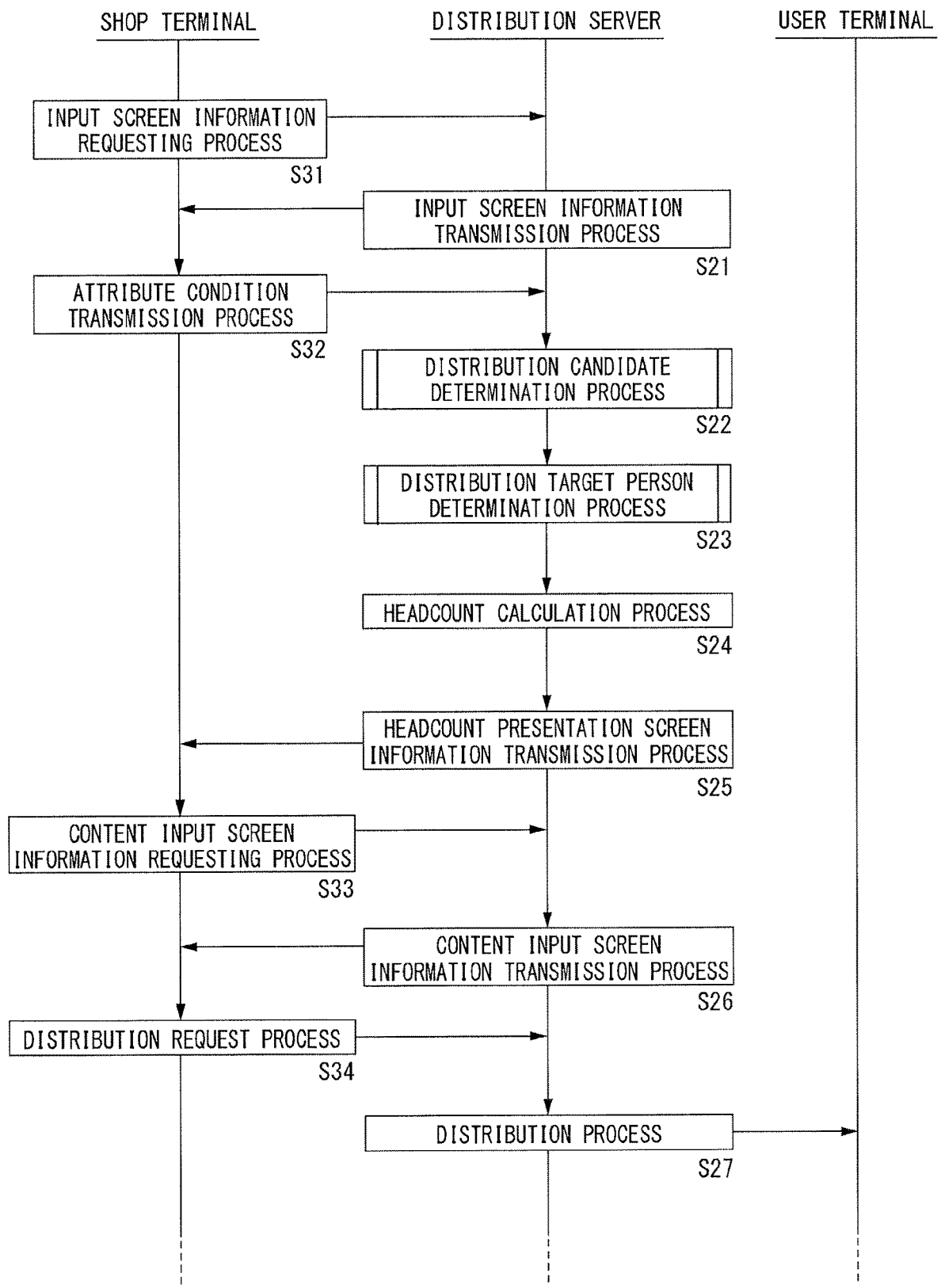
FIG. 12 is a schematic view explanatory of a typical flow of processing performed by the embodiment.

FIG. 12 shows an exemplary flow of the processing performed by the distribution server 2 and by each shop terminal 3. Explained below is an example in which the shop manager using the shop terminal 3 requests distribution of the coupon in order to utilize the distribution service offered by the distribution server 2. It is assumed that the shop manager using the shop terminal 3 has logged in to the service offered by the distribution server 2.

In step S31, the shop terminal 3 performs an input screen information requesting process to input attribute conditions to the distribution server 2.

Upon receipt of an input screen information request from the shop terminal 3, the distribution server 2 goes to step S21 and performs an input screen information transmission process. That is, the distribution server 2 causes the shop terminal 3 to display the attribute condition input screen 10.

Thereafter, in response to the input operations or manipulations performed by the shop manager on the attribute condition input screen 10, the shop terminal 3 goes to step S32 and performs an attribute condition transmission process to transmit the attribute condition information to the distribution server 2.

When the attribute condition information is transmitted from the shop terminal 3 to the distribution terminal 2, the distribution terminal 2 performs a distribution candidate determination process in step S22 to determine a distribution candidate.

Then in step S23, the distribution server 2 performs a distribution target person determination process to determine a distribution target person.

After determining the distribution target person, the distribution server 2 goes to step S24 and performs a headcount calculation process to calculate the number of the determined distribution target persons.

After calculating the number of the distribution target persons in the headcount calculation process, the distribution server 2 goes to step S25 and transmits to the shop terminal 3 the screen information constituting the headcount presentation screen 20 that presents the calculated number of the distribution target persons.

The shop manager verifying the headcount presentation screen 20 on the shop terminal 3 operates the target decision button 22. Then, the shop terminal 3 goes to step S33 and performs a process of requesting information of a screen for inputting coupon content.

Upon receipt of the request for the information of a screen for inputting coupon content, the distribution server 2 goes to step S26 and performs a process of transmitting to the shop terminal 3 the screen information constituting the coupon content input screen 30.

Thereafter, the shop manager inputs the content of the coupon to the coupon content input screen 30 on the shop terminal 3 and operates the content transmission button 32. This causes the shop terminal 3 to transmit the coupon content information to the distribution server 2 in step S34. The transmission of the coupon content information further functions as a request for distribution of the coupon to the user terminal 4 (i.e., functions as a distribution request).

Upon receipt of the coupon content information from the shop terminal 3, the distribution server 2 goes to step S27, generates the coupon data reflecting the coupon content information, and distributes the generated coupon to the user terminal 4 (a distribution process).

The steps described above make up the general flow of the processing involved with the service offered by the distribution server 2.

5-2. Processing Performed by Distribution Server

Figure 13:
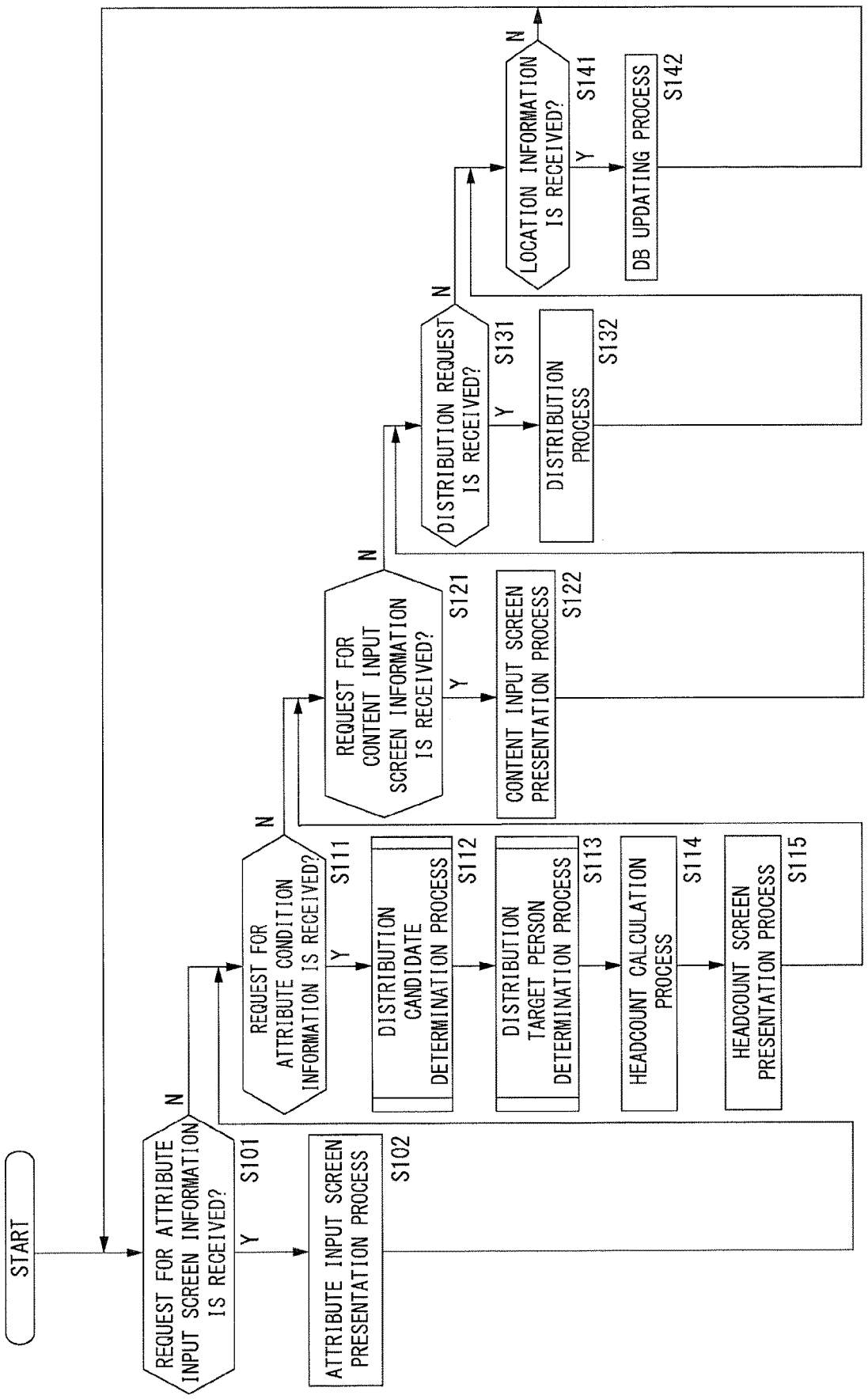
FIG. 13 is a flowchart showing a first example of processing performed by a distribution server of the embodiment.

Described below with reference to FIG. 13 is a first example of processing performed by the distribution server 2 to implement the coupon distribution service explained above.

In steps S101, S111, S121, S131, and S141, the distribution server 2 performs processes to determine whether or not information transmitted from the shop terminal 3 or the user terminal 4, such as the information about the operations by the shop manager and the location information of the distribution target person, is received.

If in step S101 the distribution server 2 determines that a request for screen information to input the attribute condition is received from shop terminal 3, the distribution server 2 passes control from step S101 to step S102. In step S102, the distribution server 2 performs an attribute input screen presentation process.

Specifically, the distribution server 2 acquires the screen information (webpage data) constituting the attribute input screen from the webpage DB 5*d*, and transmits the screen information to the shop terminal 3. Upon receipt of the screen information, the shop terminal 3 displays the attribute condition input screen 10 (FIG. 8).

If it is determined in step S111 that the attribute condition information is received from the shop terminal 3, the distribution server 2 passes control from step S111 to step S112. In step S112, the distribution server 2 performs the distribution candidate determination process.

Specifically, the distribution server 2 acquires the location information of a user from the location DB 5*b*. From the acquired location information, the distribution server 2 determines as the distribution candidate the user located within the range of a predetermined distance from the shop.

At this point, the distribution server 2 performs a process to turn on, in the location DB 5*b*, the distribution candidate flag of the user determined as the distribution candidate. The distribution candidate flag being on indicate that the corresponding user is the distribution candidate.

The predetermined distance is input from each shop terminal 3 and is requested to be registered by the shop manager beforehand. This causes the distribution server 2 to store the requested distance in the shop DB 5*c*.

Alternatively, the distribution server 2 may decide on fixed values beforehand as the determination distance information.

A first example of the distribution candidate determination process (steps S22 and S112) is described below with reference to FIG. 14.

First in step S201, the distribution server 2 turns off the distribution candidate flags of all users in the location DB 5*b*.

In step S202, the distribution server 2 performs a determination distance decision process in which the range of a determination distance is decided on. For example, the distribution server 2 decides on the determination distance range by acquiring the determination distance information from the shop DB 5*c*. As mentioned above, the distribution server 2 may acquire the determination distance range as fixed values.

In step S203, the distribution server 2 identifies the user targeted to be processed.

That is, the distribution server 2 selects as the processing target one of the users entered in the location DB 5*b*.

In step S204, the distribution server 2 determines whether or not the selected user is located within the determination distance range. Specifically, the distribution server 2 acquires the location information about the user, and determines whether or not the user is located within the determination distance range, based on the determination distance information stored in the shop DB 5*c*, for example.

That is, the distribution server 2 determines whether or not the location information about the selected user is within the range of the determination distance from the premises of the shop.

Incidentally, if the selected user's location information received by and registered in the location DB 5*b* is older than a predetermined time period, the location information may preferably not be used as valid location information. That is because the user's current location is constantly changing and because each user terminal 4 may not always transmit its location information.

For example, if the received location information is older than one hour, that location information may be regarded as invalid. Even if the location information indicates a location near the shop, that location information is not considered to fall within the determination distance range. The one-hour-old limit is only an example. For higher accuracy, the time limit may be set to ten minutes or five minutes. In some cases, the time limit may be set to two hours or thereabouts.

If it is determined that the target user is located within the determination distance range, the distribution server 2 passes control from step S204 to step S205. In step S205, the distribution server 2 turns on the distribution candidate flag of the user in the location DB 5*b*.

If it is determined that the target user is not located within the determination distance range, the distribution server 2 passes control from step S204 to step S206. That is, the distribution server 2 leaves the distribution candidate flag being turned off.

In step S206, the distribution server 2 determines whether or not the distribution candidate determination process is completed on all users.

If it is determined that the distribution candidate determination process has not been completed on all users, the distribution server 2 passes control from step S206 to step S203 and repeats the subsequent steps. That is, the distribution server 2 selects as the processing target the next user entered in the location DB 5*b*, and repeats the subsequent steps.

Figure 14:
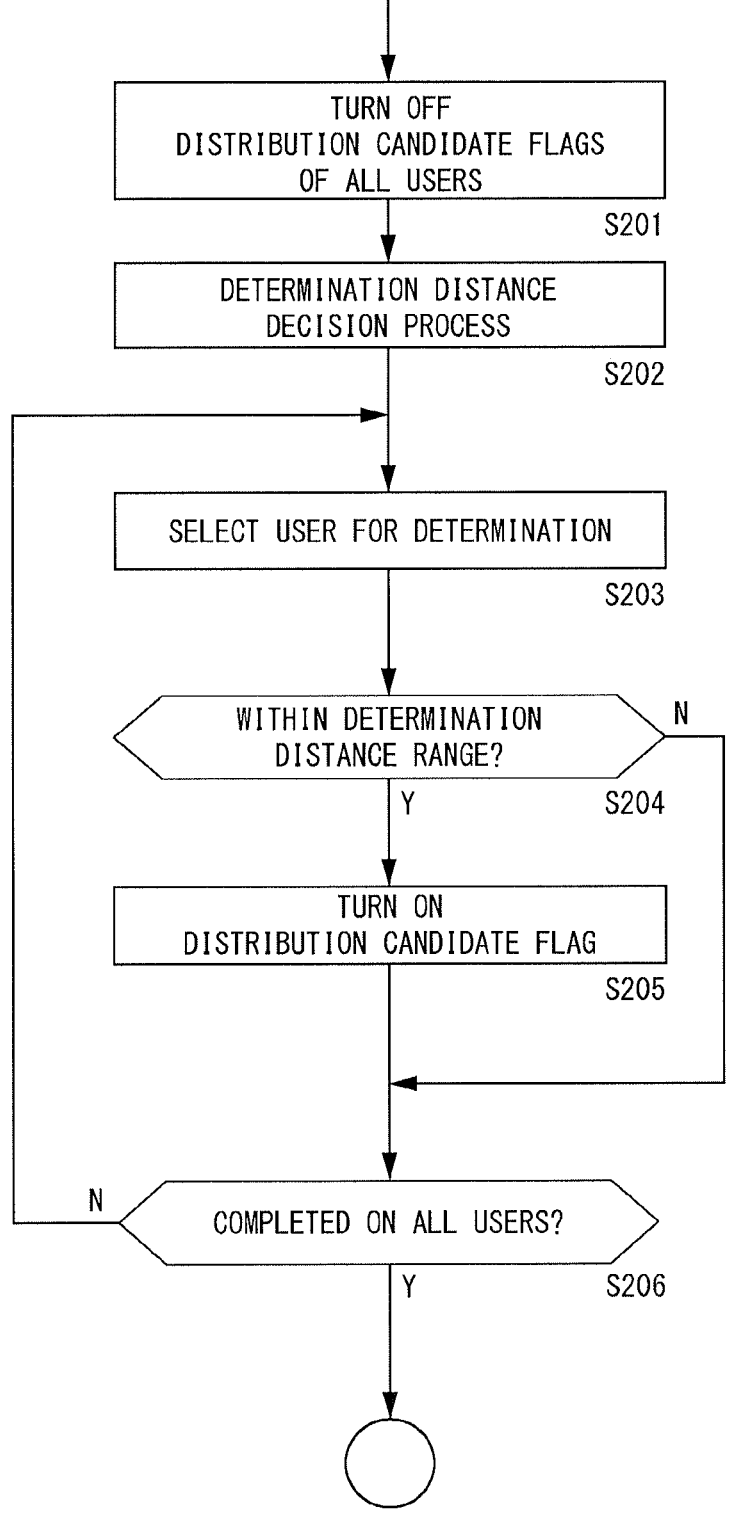
FIG. 14 is a flowchart showing a first example of a distribution candidate determination process performed by the embodiment.

If it is determined that the distribution candidate determination process is completed on all users, the distribution server 2 terminates the processing shown in FIG. 14. The distribution server 2 proceeds to perform the distribution target person determination process (steps S23 and S113) of FIG. 13.

At this point, the user with his distribution candidate flag turned on is determined definitively as the distribution candidate.

After the distribution candidate is determined as described above, the distribution server 2 goes to step S113 in FIG. 13. In step S113, the distribution server 2 performs the distribution target person determination process in which distribution target person is determined on the basis of the attribute information input by the shop manager.

Specifically, the distribution server 2 determines as the distribution target person the distribution candidate who is indicated by his distribution candidate flag as such and who matches the attribute condition information received.

A specific example of the distribution target person determination process (steps S23 and S113) is described below with reference to FIG. 15.

In step S301, the distribution server 2 performs a process of turning off the distribution target person flags of all users entered in the location DB 5*b*.

In step S302, the distribution server 2 performs an attribute condition acquisition process. Specifically, the distribution server 2 acquires the attribute condition information in the form of data received from the shop terminals 3. For example, the distribution server 2 acquires the attribute condition information such as "male," "in the twenties," and "company employee" input by the shop manager to the attribute condition input screen 10 through the shop terminal 3.

In step S303, the distribution server 2 selects one user as the processing target from among the distribution candidates. Specifically, the distribution server 2 extracts one user from among the users whose distribution candidate flags are turned on in the location DB 5*b*.

In step S304, the distribution server 2 verifies the attribute information about the distribution candidate as the processing target. Specifically, the distribution server 2 acquires the attribute information about the distribution candidate of interest by searching through the user DB 5*a* based on the user ID of the distribution candidate.

In step S305, the distribution server 2 determines whether or not the attribute of the distribution candidate correspond to the attribute condition information received from the shop terminal 3.

If it is determined that the attribute of the distribution candidate correspond to the attribute condition information received from the shop terminal 3, the distribution server 2 passes control from step S305 to step S306. In step S306, the distribution server 2 turns on the distribution target person flag of the candidate in the location DB 5*b*.

If it is determined that the attribute of the distribution candidate fails to correspond to the attribute condition information received from the shop terminal 3, the distribution server 2 passes control from step S305 to step S307. That is, the distribution server 2 leaves the distribution target person flag being turned off.

In step S307, the distribution server 2 determines whether or not the distribution target person determination process is completed on all distribution candidates.

If it is determined that the distribution target person determination process has not been completed on all distribution candidates, the distribution server 2 passes control from step S307 to step S303 and repeats the subsequent steps. That is, the distribution server 2 selects as the processing target the next user from among the distribution candidates and repeats the subsequent steps.

Figure 15:
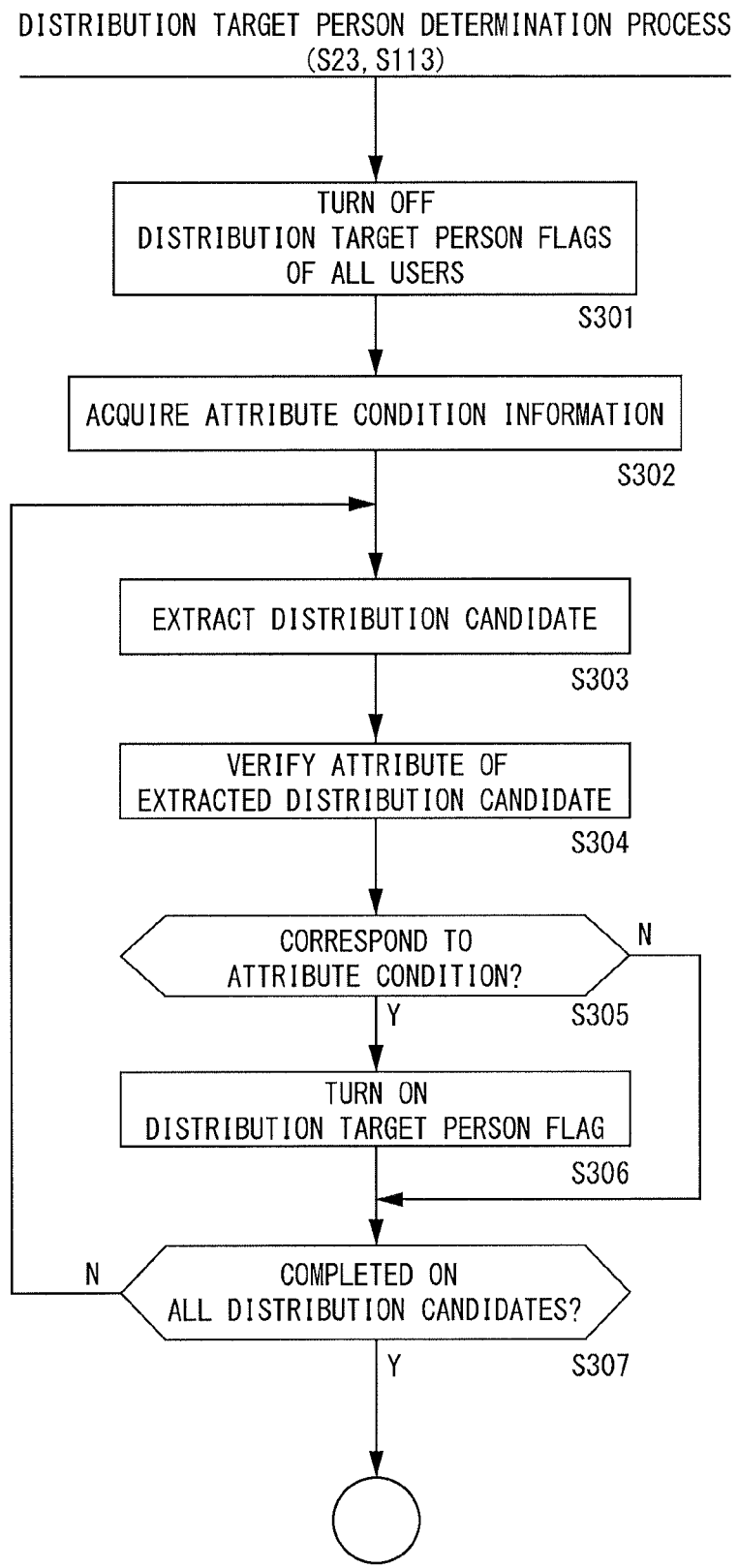
FIG. 15 is a flowchart showing the distribution target determination process performed by the embodiment.

If it is determined that the distribution target person determination process is completed on all distribution candidates, the distribution server 2 terminates the processing shown in FIG. 15. The distribution server 2 proceeds to perform the headcount calculation process (steps S24 and S114) shown in FIG. 13.

At this point, the user with his distribution target person flag turned on is determined definitively as the distribution target person.

In step S114, the distribution server 2 performs the headcount calculation process in which the number of distribution target persons is calculated.

After calculating the number of distribution target persons in the headcount calculation process, the distribution server 2 goes to step S115. In step S115, using the calculated headcount information about the distribution target persons, the distribution server 2 generates the webpage data constituting the headcount presentation screen 20 and transmits the generated webpage data to the shop terminal 3. This causes the headcount presentation screen 20 to be presented on the shop terminal 3 (FIG. 9).

If it is determined that a request for the coupon content input screen 30 is received from the shop terminal 3, the distribution server 2 passes control from step S121 to step S122. In step S122, the distribution server 2 performs a coupon content input screen information transmission process.

Specifically, the distribution server 2 acquires the coupon content input screen information from the webpage DB 5*d* and transmits the acquired screen information to the shop terminal 3. This causes the coupon content input screen 30 to be presented on the shop terminal 3 (FIG. 10).

If it is determined in step S131 that the coupon content information (i.e., a coupon distribution request) is received from the shop terminal 3, the distribution server 2 passes control from step S131 to step S132. In step S132, the distribution server 2 performs a coupon distribution process.

Specifically, the distribution server 2 generates the coupon screen information based on the coupon screen information acquired from the webpage DB 5*d* and on the received coupon content. The distribution server 2 then transmits the coupon to the user terminal 4 by email, for example. The user terminal 4 to which the coupon is transmitted is the user terminal 4 of the user whose distribution target person flag has been turned on.

In this manner, the coupon whose content has been set by the shop manager is displayed on the user terminal 4 of the user who is located near the shop of the shop manager having made the distribution request and who has the attribute designated by the shop manager.

In step S141, the distribution server 2 performs a process of determining whether or not the location information is received from any user terminal 4.

If it is determined that the location information is received from any user terminal 4, the distribution server 2 passes control from step S141 to step S142. In step S142, the distribution server 2 performs a location DB updating process.

Specifically, the distribution server 2 receives the location information transmitted periodically from the numerous user terminals 4 in the processing shown in FIG. 11. Every time the location information is received from a user terminal 4, the distribution server 2 stores the received location information into the location DB 5*b* in association with the corresponding user ID.

Figure 16:
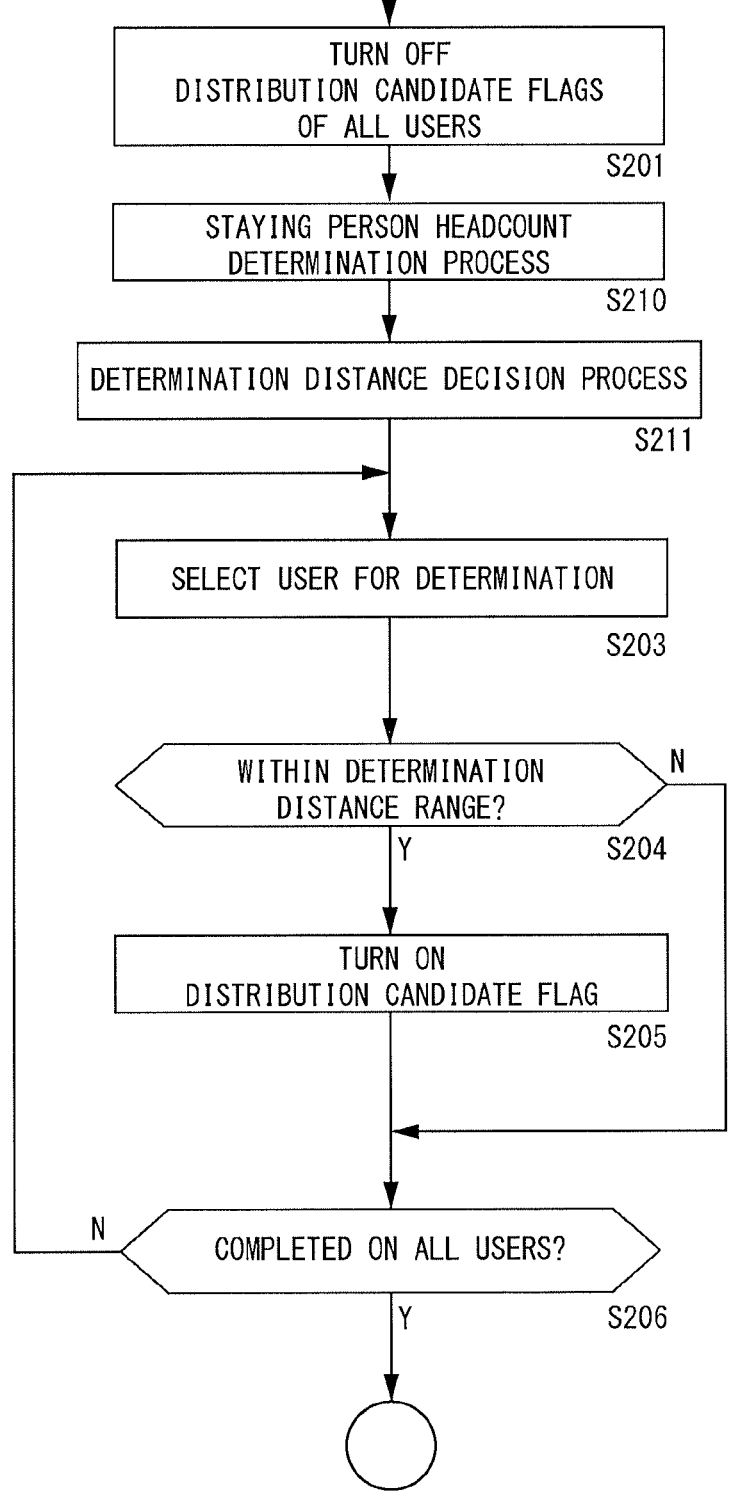
FIG. 16 is a flowchart showing a second example of the distribution candidate determination process performed by the embodiment.

6. Variations and Other Working Examples 6-1. Second Example of Distribution Candidate Determination Process A second example of the distribution candidate determination process (steps S22 and S122) is described below with reference to FIG. 16. Of the processes shown in FIG. 16, those also found in FIG. 14 are given the same reference numerals and will not be discussed further.

The second example differs from the first example (FIG. 14) in terms of step S210 for a staying person headcount determination process and in terms of step S211 for a determination distance decision process. In these processes, the distance for determining the distribution candidates is varied depending on the staying person headcount, which is the number of persons staying as customers in the shop, for example.

In step S210, the distribution server 2 performs the staying person headcount determination process in which the number of staying persons is determined. The staying person headcount determination process of the distribution server 2 may be accomplished either as a process of receiving headcount information or as a process of actually calculating the headcount.

Specifically, one procedure may involve having the headcount calculated by the shop terminal 3. For example, the shop terminal 3 may analyze images captured by video cameras set up inside the shop by use of image analysis software that distinguishes persons from the images and thereby calculate the staying person headcount. Another procedure may involve having sensors installed at the entrance of the shop to keep tabs on the persons entering and leaving the shop, thereby calculating the staying person headcount. In such cases, the shop terminal 3 transmits the headcount information to the distribution server 2. The distribution server 2 determines the staying person headcount by receiving the headcount information. Each shop terminal 3 or the like may calculate the number of staying customers at short intervals of ten seconds or five minutes, for example, and transmit the staying customer headcount to the distribution server 2. Alternatively, each shop terminal 3 or the like may transmit the staying customer headcount only at a certain point in time, e.g., when the shop terminal 3 requests the input screen from the distribution server 2.

Another procedure may involve the distribution server 2 itself determining whether the location information from each user terminal 4 is the location information based on GPS information or the location information based on a beacon. For example, the distribution server 2 may estimate that the user is inside the shop if beacon-based location information (beacon ID) is acquired regarding the users. The distribution server 2 may then calculate the number of such users.

In step S211, the distribution server 2 performs the determination distance decision process to decide on the determination distance range as the range of the distance used in determining distribution candidates. Specifically, the distribution server 2 acquires the determination distance range information from the determination distance DB 5e in accordance with the staying person headcount. For example, if the number of customers staying in the shop is "from 11 to 20" as shown in FIG. 7, the distribution server 2 acquires "200 meters" as the determination distance range from the determination distance DB 5e.

Step S203 and the subsequent steps are similar to the steps in FIG. 14. Accordingly, the distance range as the condition for determining the distribution candidates is varied depending on whether the shop is crowded or not crowded.

For example, if the shop is not crowded, the determination distance may be extended so as to raise the number of distribution candidates. Conversely, if the shop is crowded, the determination distance may be reduced so as to lower the number of distribution candidates.

6-2. Third Example of Distribution Candidate Determination Process

Figure 17:
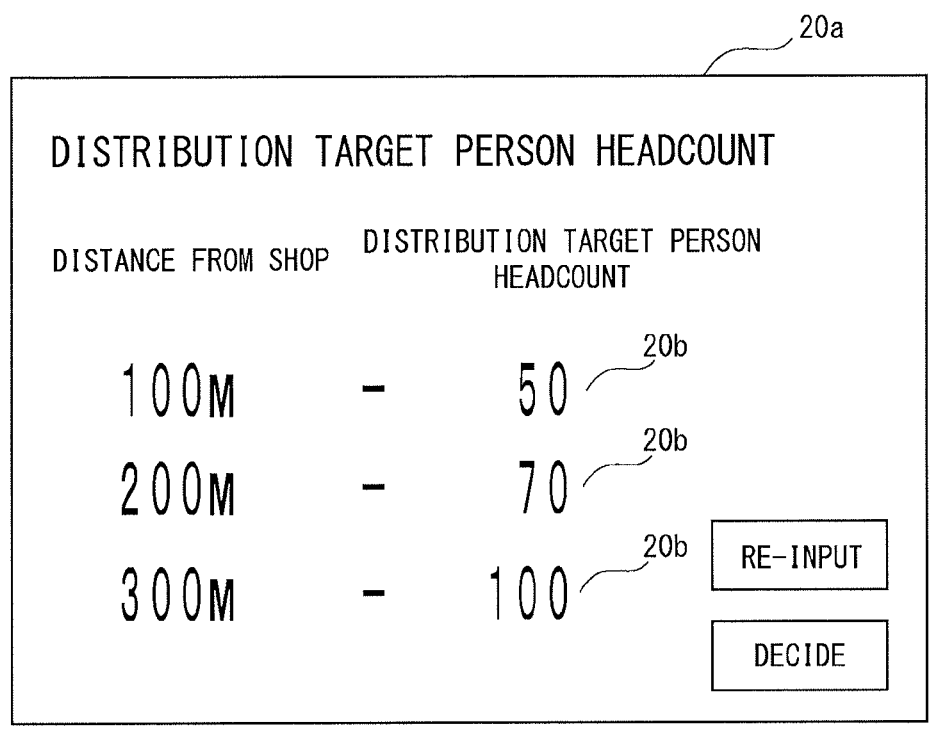
FIG. 17 is a schematic view explanatory of another presentation screen presented on the user terminal of the embodiment.

A third example of the distribution candidate determination process (steps S22 and S122) is described below with reference to FIGS. 17 and 18. Of the processes shown in FIG. 18, those also found in FIG. 14 are given the same reference numerals and will not be discussed further. This example is a variation of step S112. This is a process used to determine, as shown in FIG. 17, the distribution candidates for each of predetermined distances such as "100 meters," "200 meters," and "300 meters" from the shop. In FIG. 17, a headcount presentation screen 20a presents a headcount of distribution target persons 20b, 20b, and 20b distribution, in association with each of the determination distances.

In this example, the location DB 5b has each of the determination distances of "100 meters," "200 meters," and "300 meters" provided with a distribution candidate flag.

That is, the location DB 5b has a "100-meter distribution candidate flag," a "200-meter distribution candidate flag," a "300-meter distribution candidate flag," and a "distribution target person flag" prepared for each user.

First in step S221, the distribution server 2 turns off the "100-meter distribution candidate flag," "200-meter distribution candidate flag," and "300-meter distribution candidate flag" of all users.

In step S222, the distribution server 2 decides on "300 meters" as the determination distance range. In step S223, the distribution server 2 identifies the user targeted to be processed. That is, the distribution server 2 selects as the processing target one of the users entered in the location DB 5b.

In step S224, the distribution server 2 determines whether or not the selected user is located within the range of "300 meters" from the shop. Specifically, the distribution server 2 acquires the location information about the user for processing from the location DB 5b, and determines whether or not the user is located within the range of "300 meters" (i.e., within the determination distance range) from the shop.

Incidentally, as discussed above with reference to FIG. 14, if the received location information is older than a predetermined time period, the location information may preferably not be used as valid location information.

If it is determined that the user is located within the range of "300 meters" from the shop, the distribution server 2 passes control from step S224 to step S225. In step S225, the distribution server 2 turns on the "300-meter distribution candidate flag" of the user in the location DB 5b.

If it is determined that the user is not located within the range of "300 meters" from the shop, the distribution server 2 passes control from step S224 to step S226. That is, the distribution server 2 leaves the "300-meter distribution candidate flag" being turned off.

The above processing is performed on each user until it is determined in step S226 that the distribution candidate determination process is completed on all users with regard to the range of 300 meters.

When the distribution candidate determination process is completed on all users for the range of 300 meters, the distribution server 2 passes control to step S222a.

In step S222a, the distribution server 2 decides on "200 meters" as the determination distance range. The distribution server 2 proceeds to perform the processes of steps S223a, S224a, S225a, and S226a.

That is, after changing the determination distance range, the distribution server 2 performs processing similar to the processing of steps S223 to S226 described above. In so doing, the distribution server 2 turns on the "200-meter distribution candidate flag" of each user located within the range of 200 meters.

If it is determined in step S226a that the distribution candidate determination process is completed on all users with regard to the range of 200 meters, the distribution server 2 passes control to step S222b.

In step S222b, the distribution server 2 decides on "100 meters" as the determination distance range. The distribution server 2 proceeds to perform the processes of steps S223b, S224b, S225b, and S226b.

That is, after changing the determination distance range, the distribution server 2 performs processing similar to the processing of steps S223 to S226 described above. In so doing, the distribution server 2 turns on the "100-meter distribution candidate flag" of each user located within the range of 100 meters.

When the above processing is completed, the distribution server 2 passes control to the distribution target person determination process shown in FIG. 13 (steps S24 and S113).

In this case, in step S113 of FIG. 13, the user for whom one of the three flags "100-meter distribution candidate flag," "200-meter distribution candidate flag," and "300-meter distribution candidate flag" is on, i.e., the user for whom at least the "300-meter distribution candidate flag" is on, is checked for the attributes in order to determine the distribution target person. If the attribute conditions of a given user are met, that user's distribution target person flag is turned on.

In step S114 that follows, the headcount calculation process is performed on each user whose distribution target person flag is turned on with regard to each of the three flags "100-meter distribution candidate flag," "200-meter distribution candidate flag," and "300-meter distribution candidate flag." That is, what is calculated is: the number of the users for whom the distribution target person flags and the 300-meter distribution candidate flags are turned on; the number of the users for whom the distribution target person flags and the 200-meter distribution candidate flags are turned on; and the number of the users for whom the distribution target person flags and the 100-meter distribution candidate flags are turned on.

Using the results of the above calculations, the distribution server 2 generates the webpage data constituting the headcount presentation screen 20a and transmits the generated webpage data to the shop terminal 3. This causes the headcount presentation screen 20a such as is shown in FIG. 17 to be presented on the shop terminal 3.

The above example was shown to illustrate the distribution candidate determination process for the determination distances of "100 meters", "200 meters", and "300 meters". However, the determination distances are not limited to these three. Alternatively, there may be two, or four or more determination distances. Whereas the interval between the distances of the present variation was shown to be 100 meters, this is not limitative of the present disclosure. Alternatively, the interval between the determination distances may be 50 meters, 1,000 meters, or any other distance. Furthermore, the interval need not be constant and may be diversely varied, e.g., in a progressively increasing manner from "100 meters" to "300 meters" to "700 meters", and so on.

6-3. Second Example of Processing Performed by Distribution Server

Figure 20:
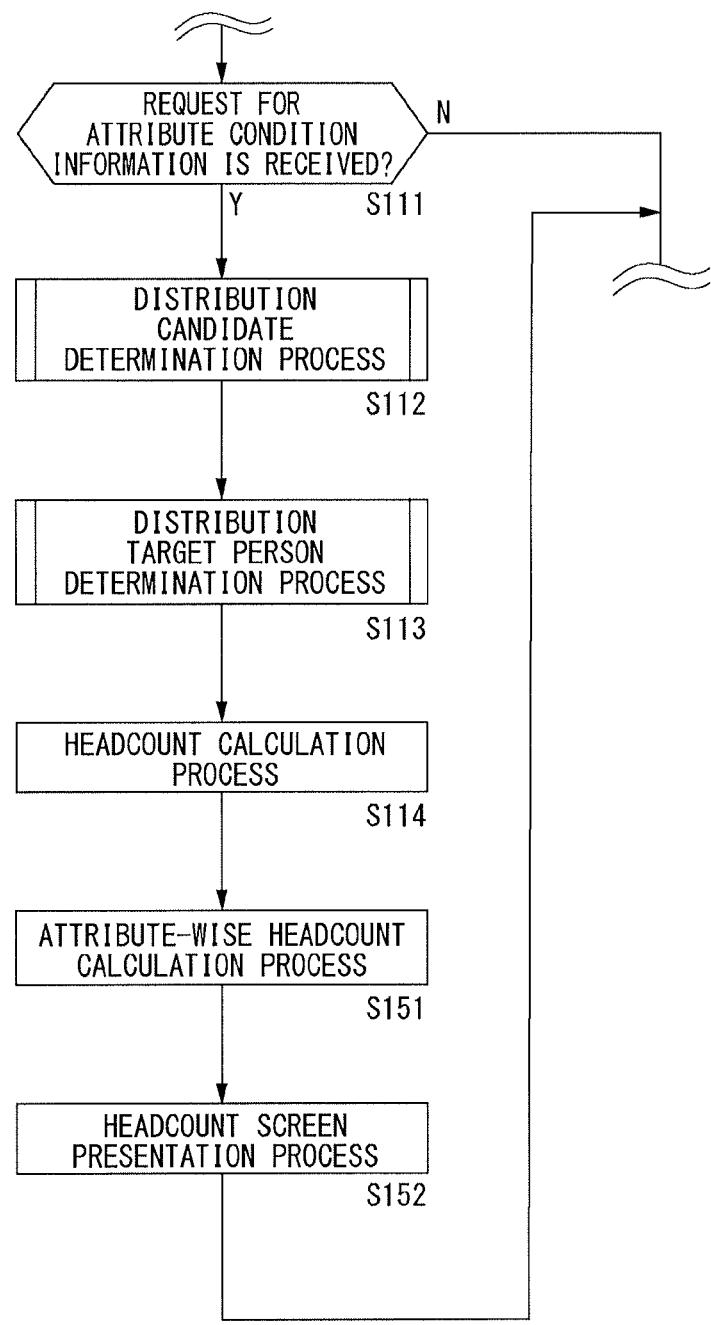
FIG. 20 is a flowchart showing a second example of the processing performed by the distribution server of the embodiment.

A second example of the processing performed by the distribution server 2 is described below with reference to FIGS. 19 and 20. Of the processes shown in FIG. 20, those also found in FIG. 13 are given the same reference numerals and will not be discussed further.

The second example differs from the first example of FIG. 13 in that step S151 is inserted between steps S114 and S115 of FIG. 13 and that step S115 is replaced with step S152.

In step S151, the distribution server 2 performs an attribute-wise headcount calculation process. Specifically, the distribution server 2 calculates an attribute-wise headcount, which is the number of the distribution candidates determined by the distribution server 2 for each of the attribute information involved. For example, the distribution server 2 acquires from the user DB 5a the attribute information about the distribution candidate whose distribution target person flag is turned on in the location DB 5b. The distribution server 2 then calculates the distribution target person headcount for each of diverse attributes such as "gender," "age," and "profession," as shown in FIG. 19.

In step S152, the distribution server 2 generates the webpage data constituting a headcount presentation screen 20c such as is shown in FIG. 19, using the information about the calculated number of distribution target persons and the information about the attribute-wise numbers of distribution candidates. The distribution server 2 transmits the generated webpage data to the shop terminal 3. This causes the headcount presentation screen 20c to be presented on the shop terminal 3.

That is, the example of FIG. 19 shows that 50 distribution target persons are located near the shop as the persons having the attributes designated by the shop manager. In practice, however, there may presumably be far more distribution candidates not determined as the distribution target persons. Thus the information is presented here to show the persons, including the distribution candidates, with specific attributes are near the shop.

This allows the shop manager to know, for example, the distribution candidates who do not correspond to the input attribute conditions but who may be potential customers for the shop, as when a large number of distribution candidates lacking the input attribute conditions but corresponding to hitherto-overlooked attribute conditions are located around the shop.

A calculating procedure may involve the distribution server 2 acquiring shop genre information from the shop DB 5c and, based on the attribute in accordance with the acquired shop genre, calculating the number of distribution candidates corresponding to the attribute.

For example, if the shop is a vendor that sells men's wear for the young generation, the attributes of the shop are assumed to be "in the twenties," "company employee," and "male." The distribution server 2 then calculates the number of the distribution target persons having these attributes among the distribution candidates.

6-4. Third Example of Processing Performed by Distribution Server

A third example of the processing performed by the distribution server 2 is described below with reference to FIGS. 21 and 22. Of the processes shown in FIG. 22, those also found in FIG. 13 are given the same reference numerals and will not be discussed further.

The third example differs from the first example of FIG. 13 in that step S161 is inserted between steps S114 and S115 of FIG. 13 and that step S115 is replaced with step S162.

In step S161, the distribution server 2 performs an attribute-wise proportion calculation process. Specifically, the distribution server 2 calculates an attribute-wise proportion, which is a proportion of distribution candidates determined by the distribution server 2 for each attribute information. For example, the distribution server 2 acquires from the user DB 5*a* the attribute information about the distribution candidates and calculates the proportion of the distribution candidates for each of diverse attributes such as "male-female ratio," "distribution of candidates by age," and "proportions of candidates by profession."

An exemplary calculating procedure may involve the distribution server 2 acquiring the shop genre information from the shop DB 5*c* and, based on the attributes in accordance with the acquired shop genre, calculating the proportion of the distribution candidates for each of these attributes to the distribution candidates. For example, if the shop is a vendor that sells men's wear for the young generation, the attributes of the shop are assumed to be "age," "profession," and "gender." Then, for each of the attributes, the distribution server 2 calculates the proportion of the distribution target persons having a corresponding attribute to the distribution candidates.

Figure 21:
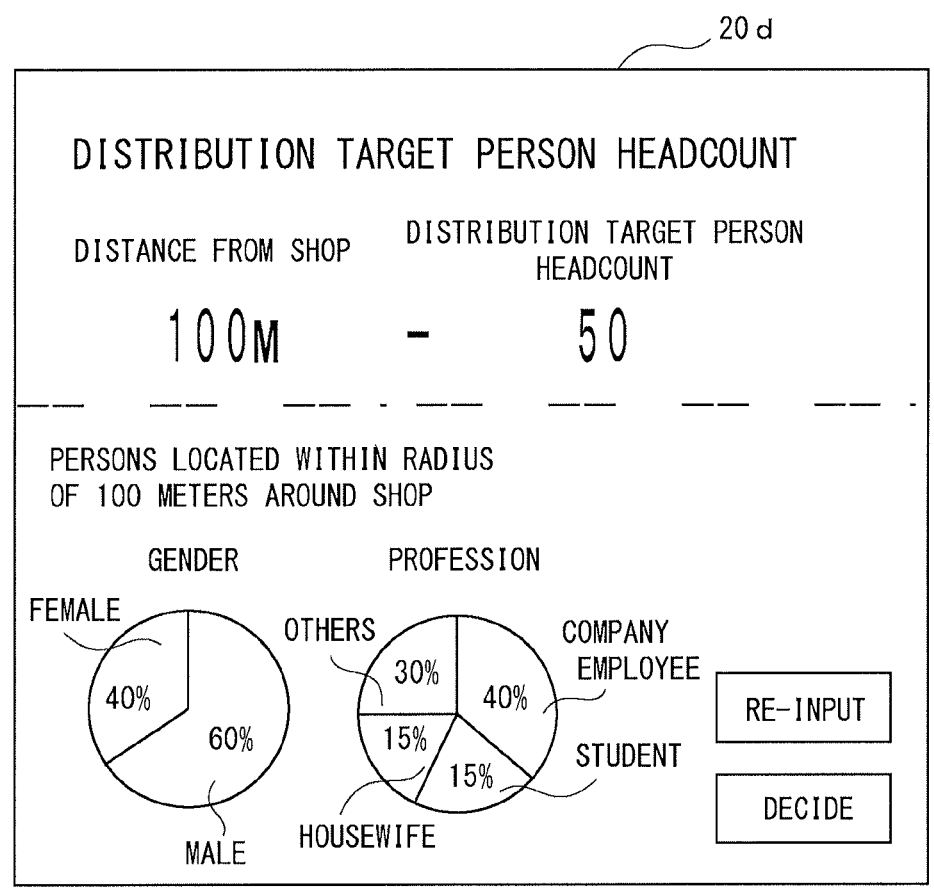
FIG. 21 is a schematic view explanatory of another presentation screen presented on the user terminal of the embodiment.

In step S162, the distribution server 2 generates the webpage data constituting a headcount presentation screen 20*d* such as is shown in FIG. 21, using the calculated headcount information about the distribution target persons and the attribute-wise proportion information about the distribution candidates. The distribution server 2 transmits the generated webpage data to the shop terminal 3. This causes the headcount presentation screen 20*d* to be presented on the shop terminal 3.

That is, the example of FIG. 21 presents the information indicating that there are 50 distribution target persons along with the attribute-wise proportion information about the persons near the shop including the distribution candidates not qualified as the distribution target persons.

7. Conclusion

The above-described embodiment offers the following advantages:

The distribution server 2 (information processing device) of the embodiment includes the attribute condition acquisition unit 2*a* that acquires from each shop terminal 3 (distribution requester terminal) the distribution target person attribute, which is used as a condition for extracting distribution target persons; the distribution candidate determination unit 2*b* that determines as the distribution candidate the person located within the range of a predetermined distance from the shop (premises) designated by the shop terminal 3 (distribution requester terminal); the distribution target person determination unit 2*c* that determines as the distribution target person a person who corresponds to the distribution condition from among the distribution candidates; the headcount calculation unit 2*d* that calculates the number of distribution target persons; the presentation control unit 2*e* that causes the shop terminal 3 (distribution requester terminal) to present the number of the distribution target persons; the distribution request acquisition unit 2*f* that acquires a distribution request from the shop terminal 3 (distribution requester terminal); and the information distribution unit 2*g* that distributes the information corresponding to the distribution request to the user terminal 4 of the distribution target person.

The shop manager (distribution requester) receiving the service of the above distribution server 2 can verify the number of the distribution target persons who are located near the shop and who correspond to the attribute information designated as desired through the shop terminal 3.

Thereafter, using the shop terminal 3, the shop manager may designate to the distribution server 2 the content of the coupon in accordance with the number of the corresponding distribution target persons. In this manner, the shop manager can request the distribution server 2 to distribute the coupon of the designated content to the distribution target persons.

The shop manager is thus able to verify easily the number of the persons who are located near the shop and who have the attributes making them qualified for distribution. Because the distribution information is generated in accordance with the verified number of the distribution target persons, it is possible to distribute the coupon of which the content is designed to better attract the attention of the distribution target persons.

For example, the shop manager can consider the content of the coupon in view of the displayed headcount. For example, if there are only a small number of distribution target persons who correspond to the input attribute conditions and who are located within the range of a predetermined distance, the shop manager may offer a 30% discount; if there are a large number of the applicable distribution target persons, the shop manager may change the discount rate to 10%. In this manner, the shop manager may distribute to the distribution target persons the coupon of which the content is flexibly varied depending on the number of the persons near the shop. This promotes the use of the distribution information about the distribution target persons and permits more efficient distribution of the information from the shop.

The distribution server 2 also includes the staying person headcount determination unit 2*h* that determines the number of persons staying in the shop (premises). The predetermined distance range is varied depending on the number of persons staying in the shop (premises) (see FIG. 16).

As a result, the number of distribution target persons is varied in keeping with the number of persons staying in the shop.

The shop manager may thus change the number of persons to whom the information is distributed in accordance with the number of persons staying in the shop. This promotes the use of the distribution information about the distribution target persons in a manner reflecting the situation of the shop. As a result, the shop can efficiently entice people to come to the shop.

The headcount calculation unit 2*d* calculates the number of distribution target persons for each of predetermined distances from the shop (premises) (see FIGS. 17 and 18).

This allows the shop manager to verify the number of distribution target persons for each of the predetermined distances from the shop.

Because the shop manager can select the range in which to distribute the coupon by referring to the number of distribution target persons for each predetermined distance, the shop manager can entice people to come to the shop more efficiently.

The distribution server 2 further includes the attribute-wise headcount calculation unit 2*i* that calculates an attribute-wise headcount, which is the number of the distribution candidates determined by the distribution candidate determination unit 2*b* for each attribute information. The presentation control unit 2*e* causes the attribute-wise headcount to be presented on the shop terminal 3 of the shop manager (see FIGS. 19 and 20).

This allows the shop manager to verify the number of the persons whose attributes do not correspond to the attribute conditions selected by the shop manager.

Accordingly, the shop manager may come to know that there are numerous distribution candidates who meet hitherto-overlooked attribute conditions and who are located near the shop, for example. The shop manager may thus recognize the distribution candidates who do not have the input attribute conditions but who are nevertheless potential customers for the shop.

The distribution server 2 also includes the attribute-wise proportion calculation unit 2j that calculates as an attribute-wise proportion, which is a proportion of the distribution candidates determined by the distribution candidate determination unit 2b for each attribute information. The presentation control unit 2e causes the attribute-wise proportion to be presented on the shop terminal 3 of the shop manager (see FIGS. 21 and 22).

This allows the shop manager to verify the proportion of the persons who do not correspond to the attributes selected by the shop manager.

Thus, the shop manager can easily verify the proportion of the persons who do not correspond to the attributes selected by the shop manager. In referencing such proportions, the shop manager can select the persons with the attributes applicable to the shop and consider the content of the coupon accordingly. As a result, the shop can entice people to come to the shop more efficiently.

Figure 22:
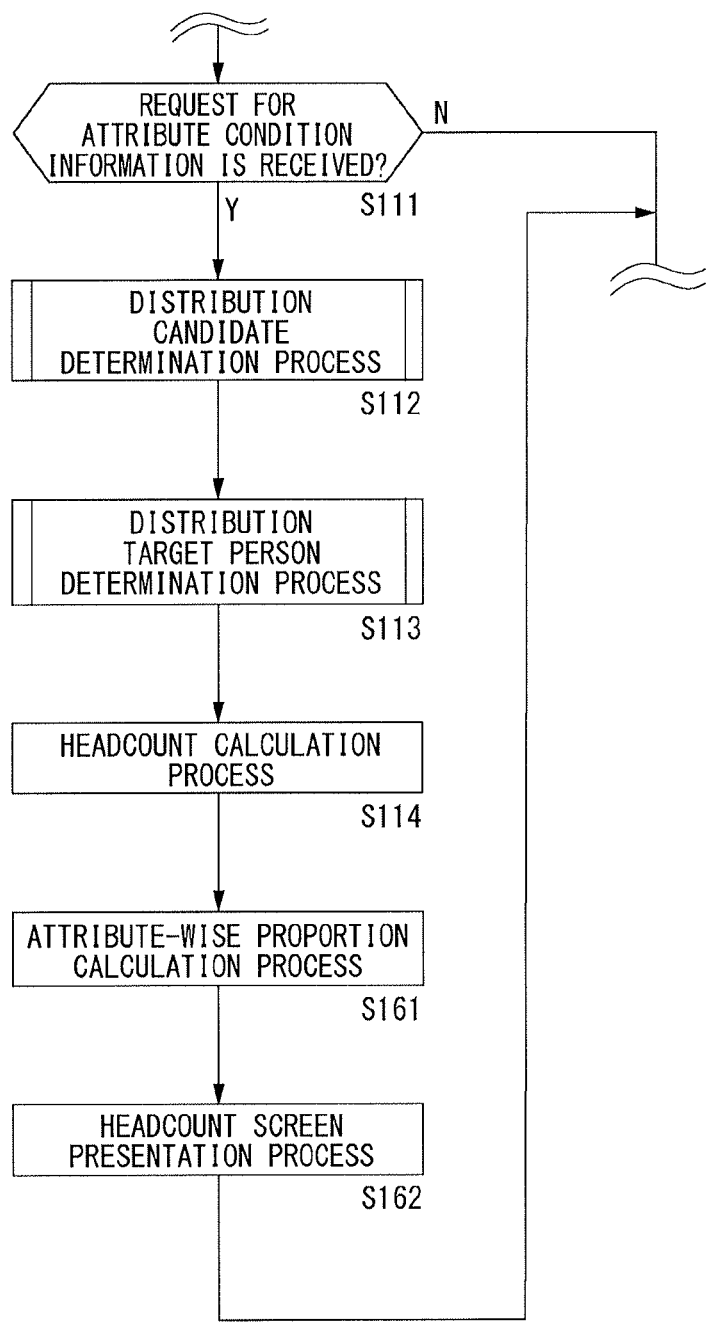
FIG. 22 is a flowchart showing a third example of the processing performed by the distribution server of the embodiment.

The attribute-wise proportion calculation unit 2j calculates as the attribute-wise-proportion, which is a proportion of distribution candidates for each attribute information set for a genre of the shop (premises) (see FIGS. 21 and 22).

This allows the shop manager to view the information about the attribute-wise proportion of the distribution candidates having the attributes related to the shop manager's shop.

Because the attribute-wise information about unrelated genres is prevented from being displayed, the shop manager can easily view the attribute-wise proportion information necessary for the shop manager's shop. Consequently, the shop manager can re-select the attributes applicable the shop more easily.

8. Program and Storage Medium

The distribution server 2 as the information processing device embodying the present disclosure was described above. A program of the present embodiment is a program for causing the information processing device (e.g., CPU) to perform the processes of at least the attribute condition acquisition unit 2a, the distribution candidate determination unit 2b, the distribution target person determination unit 2c, the headcount calculation unit 2d, the presentation control unit 2e, the distribution request acquisition unit 2f, and the information distribution unit 2g of the distribution server 2.

The program of the embodiment causes the information processing device to perform the process of acquiring from the shop terminal 3 (distribution requester terminal) the attribute condition of a distribution target person as a condition for extracting the distribution target person. The program also causes the information processing device to perform the process of determining as the distribution candidate a person located within the range of a predetermined distance from the shop (premises) designated through the shop terminal 3 (distribution requester terminal). The program also causes the information processing device to perform the process of determining as the distribution target person the distribution candidate corresponding to the distribution condition. The program further causes the information processing device to perform the process of calculating the number of the distribution target persons. The program also causes the information processing device to perform the process of getting the shop terminal 3 (distribution requester terminal) to present the distribution target person headcount. The program further causes the information processing device to perform the process of acquiring a distribution request from each shop terminal 3 (distribution requester terminal). The program also causes the information processing device to perform the process of distributing the information reflecting the distribution request to the user terminal 4 of the distribution target person.

That is, this is a program that causes the distribution server 2 to perform the processes discussed above with reference to FIGS. 13 to 16, 18, 20, and 22.

The above-described program implements the information processing device serving as the distribution server 2 explained above.

The program may be recorded in advance on an HDD as an internal recording medium incorporated typically in a device such as a computer device or stored beforehand in a ROM inside a microcomputer having a CPU, or the like. Alternatively, the program may be stored (recorded) temporarily or permanently on a removable recording medium such as a semiconductor memory, a memory card, an optical disk, a magneto-optical disk, a magnetic disk, or the like. Such removable recording media may be offered in the form of so-called package software.

The program may be installed from the removable recording medium into a personal computer, for example. The program may also be downloaded from a download site via a network such as a LAN or the Internet.

9. Second Embodiment

A second embodiment of the present disclosure is described below with reference to FIGS. 23, 24A, and 24B.

The second embodiment explained below is an example in which the distribution requester terminal is the shop terminal 3 and in which the distribution server 2 causes the shop terminal 3 to present the range within which the coupon as the distribution information is distributed in keeping with a detection technique being used when the shop manager utilizes the distribution service offered by the distribution server 2.

The detection technique mentioned above is a technique that acquires location information needed by the distribution server 2 to distribute the distribution information. A first detection technique is preferably a technique that acquires latitude and longitude information over a wide range. With the second embodiment, the first detection technique will be explained as GPS, for example. The first detection technique corresponds to the technique that detects the user terminal 4 in the distribution candidate determination process of the first embodiment. A second detection technique is preferably a technique capable of acquiring location information over a very close range from detection equipment. In this respect, Bluetooth (registered trademark) equipment may be appropriate, for example. The second detection technique corresponds to the technique that determines the number of staying persons in the shop in the staying person headcount determination process of the first embodiment. The present embodiment employs, for example, a beacon that uses the Bluetooth low energy (BLE) technology to transmit a universally unique identifier (UUID) permitting acquisition of location information over a range close to the detection equipment. That is, the second detection technique in this is a Bluetooth signal transmitter.

For example, an application for receiving the distribution of the coupon is preinstalled in the user terminals 4 and activated therein beforehand. The application causes the user terminal 4 to always transmit to the distribution server 2 its location information acquired by GPS by the first detection technique. The application further causes the user terminal 4 to wait for a beacon signal transmitted by the second detection technique.

Figure 23:
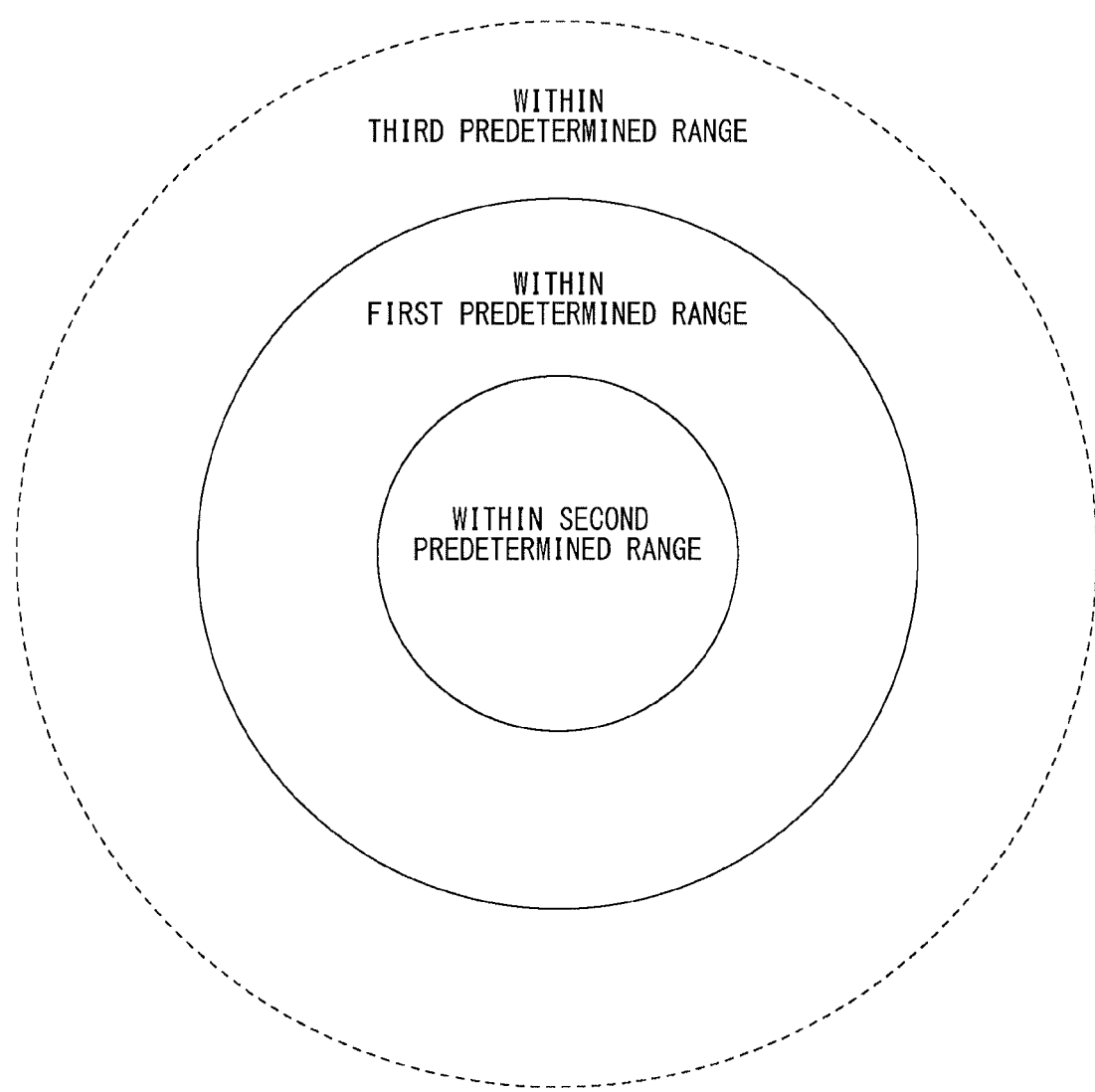
FIG. 23 is a schematic view explanatory of predetermined ranges to be detected by a detection technique of a second embodiment of the present disclosure.

With the second embodiment, as shown in FIG. 23, a first predetermined range, a second predetermined range, and a third predetermined range are set up, as will be described below as exemplary ranges for distributing the distribution information.

The first predetermined range refers to the distance which is detected by the first detection technique (e.g., a technique using GPS) and over which the premises (shop) can be easily reached by potential customers. For example, this range may be the distance of approximately 100 meters from the target premises.

The second predetermined range refers to the distance detected by the second detection technique (e.g., a technique using the near field communication technology such as BLE beacon or ultrasonic communication). This range may be the distance of approximately 10 meters from the premises (shop) or the inside of the premises.

The third predetermined range refers to the distance which is detected by the first detection technique (e.g., a technique using GPS), which surpasses the first predetermined range, and over which the premises (shop) may not be reached easily. For example, this range may be the distance of approximately 300 meters away from the shop.

That is, the present embodiment uses the first detection technique (e.g., a technique using GPS) to detect the user terminal 4 located within the first predetermined range of approximately 100 meters while utilizing the second detection technique that is different from GPS (e.g., a technique using the near field communication technology such as BLE beacon or ultrasonic communication) to detect whether or not there is the user terminal 4 located within the second predetermined range of several meters inside the first predetermined range. Based on the results of detection by the first and the second detection technique, the present embodiment can identify the numbers of the user terminals 4 located within the first, the second, and the third predetermined ranges. Also, based on the results of such identification and in keeping with the situation of the shop, the second embodiment may selectively transmit the distribution information to the user terminals 4 located within the respective predetermined ranges.

GPS can only determine that the users having the user terminals 4 are near the shop. It is impossible with GPS alone to determine whether or not these users are staying in the shop. On the other hand, a BLE beacon can only determine that the users having the user terminals 4 are inside the shop; it is impossible with the BLE beacon alone to determine whether the users are located outside of the shop but within the distance of a few hundred meters of the shop. By contrast, the present embodiment uses multiple detection techniques operated by different methods (e.g., GPS and BLE beacon technologies), so that the followings can be determined: with GPS, whether the users having the user terminals 4 are located close enough to visit the shop; and with the BLE beacon, whether the users having the user terminals 4 are actually inside (staying in) the shop.

In the manner described above, the present embodiment permits flexible distribution of the coupon depending on the weather condition outside the shop and on the degree of crowdedness in the shop. For example, consider a case where a hamburger shop distributes coupons. In this case, it is not much effective to distribute a discount coupon regarding hamburger set menus to the users already inside the shop and eating the hamburger set menus offered by the shop. However, it may possibly be effective to offer these users a dessert menu coupon for use after meal. Meanwhile, the users located outside but near the shop may possibly be enticed to visit the shop if they are offered a hamburger set menu discount coupon before noon. Further, control of the distribution may be changed for different shop genres. For example, control for eateries is made different from control for product vendors. With the eatery, control may be performed to offer the coupon only outside the shop; with the product vendor, control may be exercised to offer the coupon both inside and outside the shop.

In such cases, the second detection technique is preferably an infrared beacon or an acoustic beacon system, i.e., a communication technology which does not easily let its beacon signal penetrate a wall. The use of this kind of system is intended to better ascertain that the user terminals 4 are located inside the shop. Alternatively, another communication system may be adopted in parallel using millimeter waves or microwaves, which penetrate a wall easily. These different kinds of communication systems may be switched over depending on the number of persons staying in the shop, for example.

Figure 24A:
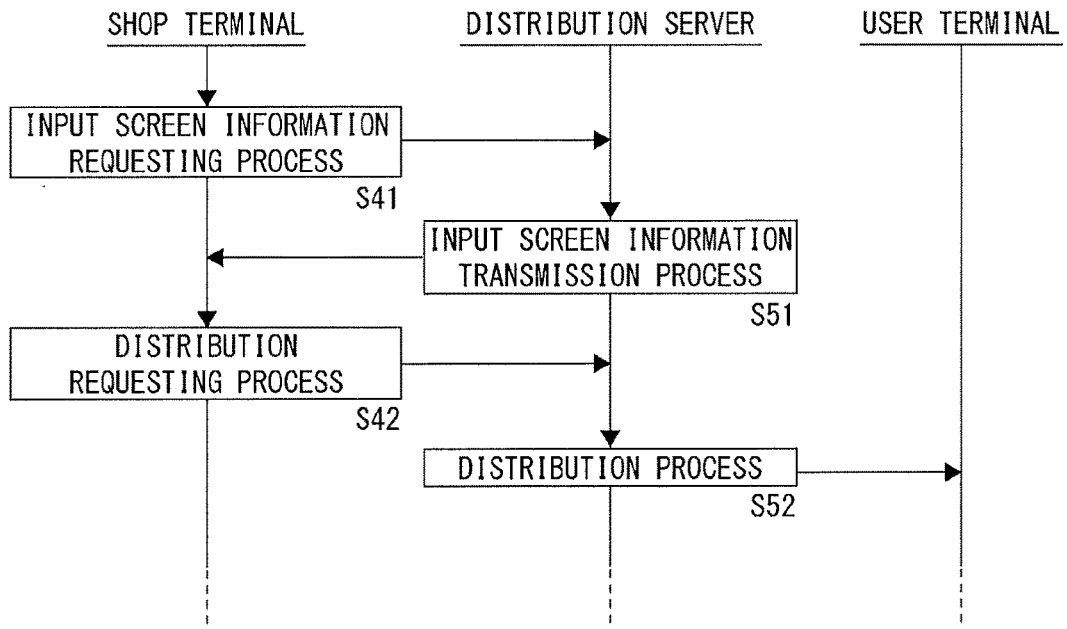
FIGS. 24A and 24B are schematic views explanatory, respectively, of an exemplary flow of processing performed by the second embodiment and an exemplary flow of processing performed by a distribution server of the second embodiment.

FIG. 24A shows an exemplary flow of processing performed by the distribution server 2 and by the shop terminal 3.

The processing explained below is an example in which the shop manager sends a coupon distribution request using the shop terminal 3 in order to utilize the coupon distribution service provided by the distribution server 2. It is assumed that the shop manager using the shop terminal 3 has logged in to the service provided by the distribution server 2.

In step S41, the shop terminal 3 performs an input screen information requesting process to input to the distribution server 2 the ranges in which the coupon is to be distributed.

Upon receipt of an input screen information request from the shop terminal 3, the distribution server 2 goes to step S51 to perform an input screen information transmission process. That is, the distribution server 2 causes the shop terminal 3 to display a screen to which the ranges of distribution and the content of the coupon are to be input. At this point, the shop manager performs operations to input the content of the coupon to be distributed to the user terminal 4.

The distribution ranges to be input may include, for example, a first predetermined range, a second predetermined range, and a sub-range within the first predetermined range excluding the second predetermined range. The coupon content to be input may be "20% discount on all items if you visit us now," or "10% discount on specific items if you visit us this month," for example.

Thus if it is desired to distribute the coupon to the user terminal 4 of every user targeted for distribution, including the user inside the shop, the first predetermined range is selected. If it is desired to distribute the coupon to the user terminal 4 of the user located inside or near the premises, the second predetermined range is selected. If it is desired to distribute the coupon to the user located outside the premises, the sub-range within the first predetermined range excluding the second predetermined range is selected. In this manner, the appropriate coupon is distributed to the target user desired by the shop manager.

The predetermined ranges desired by the shop manager are not limited to those described above. Alternatively, a third predetermined range may be set up to be detected by the first detection technique, the third predetermined range being more extensive than the first predetermined range.

In that case, the users located only within 100 meters of the shop may be offered a coupon promising, for example, "10% discount if you visit us right now"; the users located 3 kilometers or more from the shop and not expected to visit the shop at short notice may be offered a coupon promising "5% discount if you visit us this week," for example. In this manner, coupons can be transmitted flexibly to the users depending on their location.

Thereafter, in step S42, the shop terminal 3 performs a distribution requesting process to transmit the content of the distribution, the ranges of the distribution, and a distribution request to the distribution server 2 in accordance with input operations or other suitable manipulations by the shop manager.

Upon receipt of the content of the distribution, the ranges of the distribution, and the distribution request from the shop terminal 3, the distribution server 2 goes to step S52. In step S52, the distribution server 2 generates the coupon data making up the content of the coupon for distribution, and distributes the coupon to the user terminals 4 extracted from the designated ranges.

The steps described above constitute the general flow of the processing of the service provided by the distribution server 2.

Figure 24B:
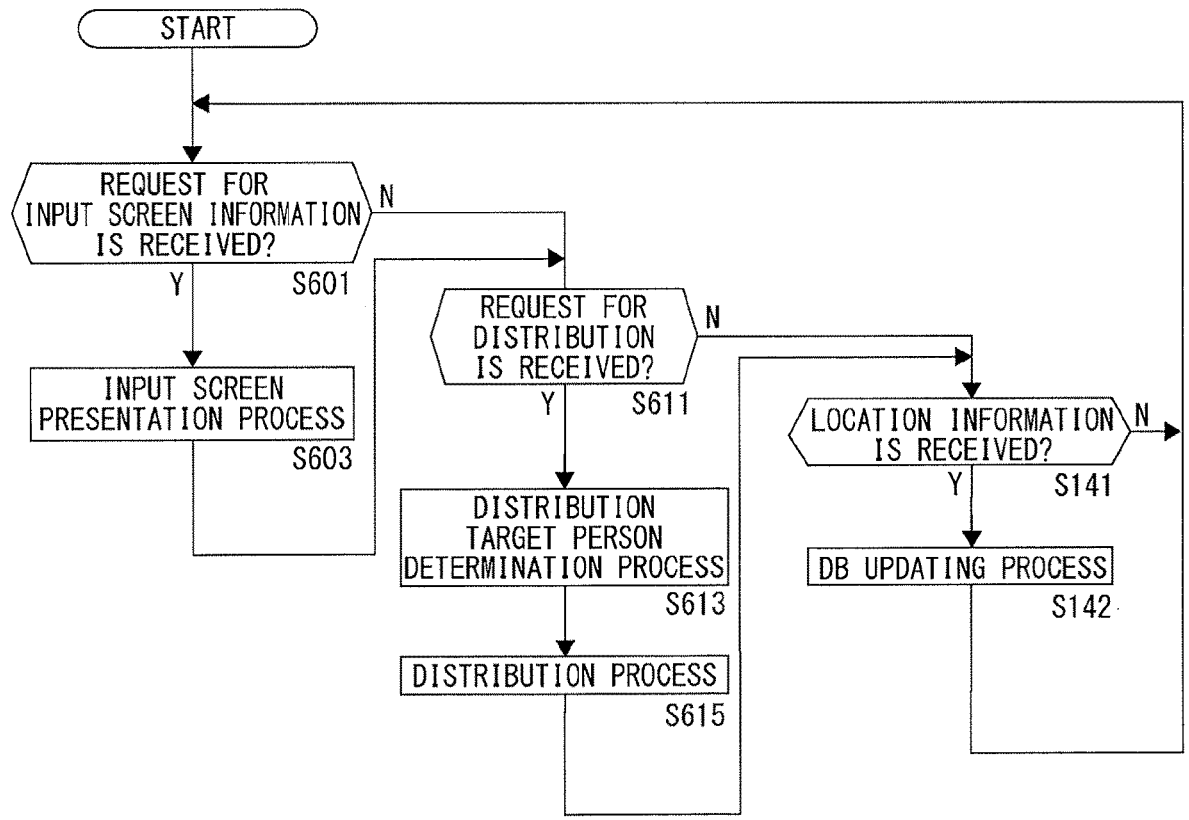

Described below with reference to FIG. 24B is the processing performed by the distribution server 2 to implement the coupon distribution service outlined above.

In steps S601, S611, and S141, the distribution server 2 performs processes of determining whether or not the user location information or other relevant information has been received from the user terminals 4.

If in step S601 the distribution server 2 determines that a request is received for the information constituting a screen to which the ranges for coupon distribution are to be input, the distribution server 2 passes control from step S601 to step S603. In step S603, the distribution server 2 performs a process of presenting the screen to which to input the ranges for coupon distribution.

If in step S611 the distribution server 2 determines that the content of the distribution, the ranges of the distribution, and the request for distribution are received from the shop terminal 3, the distribution server 2 passes control from step S611 to step S613. In step S613, the distribution server 2 performs a distribution target person determination process.

Specifically, the distribution server 2 determines as the distribution target terminal the user terminal 4 about which the location information has been received in the past one hour from a location that fall in the ranges designated by the shop manager. The user terminal 4 thus determined is extracted from the location DB 5b. In this determination process, the distribution target terminal is not limited to the user terminal 4 about which the location information has been received in the past one hour from locations within the ranges designated by the shop manager. Alternatively, the distribution target terminal may be the user terminal 4 about which the location information has been received in the past five seconds, ten minutes, or any other past time period desired.

In step S615, the distribution server 2 performs a process of distributing the coupon to the user terminal 4 determined as the distribution target terminal.

In step S141, the distribution server 2 performs a process of determining whether or not the location information has been received from any user terminal 4.

If it is determined that the location information has been received from any user terminal 4, the distribution server 2 passes control from step S141 to step S142. In step S142, the distribution server 2 performs a process of updating the location DB 5b.

Specifically, as in the processing of FIG. 11, the distribution server 2 receives the location information transmitted periodically from the numerous user terminals 4. Every time the location information is received from the user terminal 4, the distribution server 2 stores the received location information into the location DB 5b in association with the corresponding user ID. Particularly in the present embodiment, both the GPS location information and the beacon are used as the location information. Accordingly, the distribution server 2 determines whether the received location information is obtained from GPS or on the basis of the beacon ID. The type of location information thus determined is also stored into the location DB 5b.

After completing the process of step S141 or S142, the distribution server 2 returns to step S601 and repeats the subsequent steps.

As in the processing of the first embodiment in FIG. 13, the second embodiment enables the shop manager to input the attribute condition desirable for distribution in order to present the number of the user terminals 4 owned by the users who meet the attribute condition and who are located within the first or the second predetermined range. This allows the shop manager to decide on the content of the coupon in consideration of the number of the users deemed receptive to distribution within the first or the second predetermined range.

10. Third Embodiment

A third embodiment of the present disclosure is described below with reference to FIGS. 25A, 25B, and 26.

The third embodiment provides a location information distribution service as follows: in implementing the service, the third embodiment acquires the location information about each user terminal 4 using two location information detection techniques: first location information detection technique that acquires latitude and longitude information over extensive ranges, and second location information detection technique that utilizes a communication system of which the signal has more difficulty in penetrating a wall than the first detection technique. By obtaining the current location of the users more accurately in this manner, the third embodiment with its location information distribution service guides the user to the destination. In the ensuing description of the present embodiment, each user terminal 4 is regarded as the distribution requester terminal.

It is assumed here that a given user makes use of the location information distribution service for the purpose of going to one of multiple shops located in a building.

In this case, the first predetermined range shown in FIG. 23 means the range covering the locations that can be detected by GPS information outside the building. Also in this case, the second predetermined range means the shop as the user's destination detected by beacon inside the building.

Described below is an example of processing performed by the distribution server 2 in implementing the location information distribution service. The same processes as those of the first embodiment will not be discussed further.

Figure 25A:
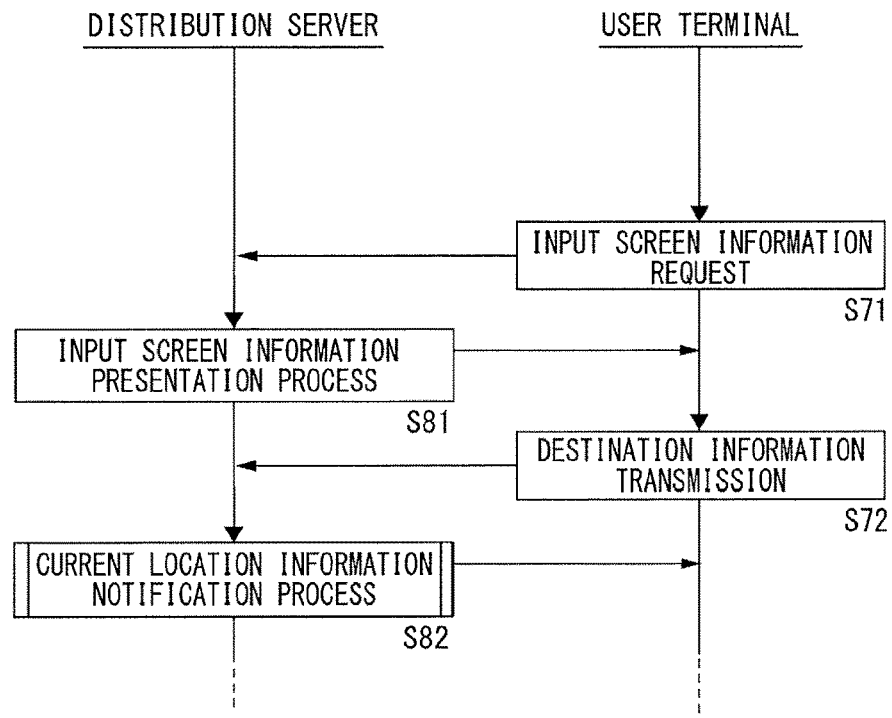
FIGS. 25A and 25B are schematic view explanatory, respectively, of an exemplary flow of processing performed by a third embodiment of the present disclosure and an exemplary flow of processing performed by a distribution server of the third embodiment.
Figure 25B:
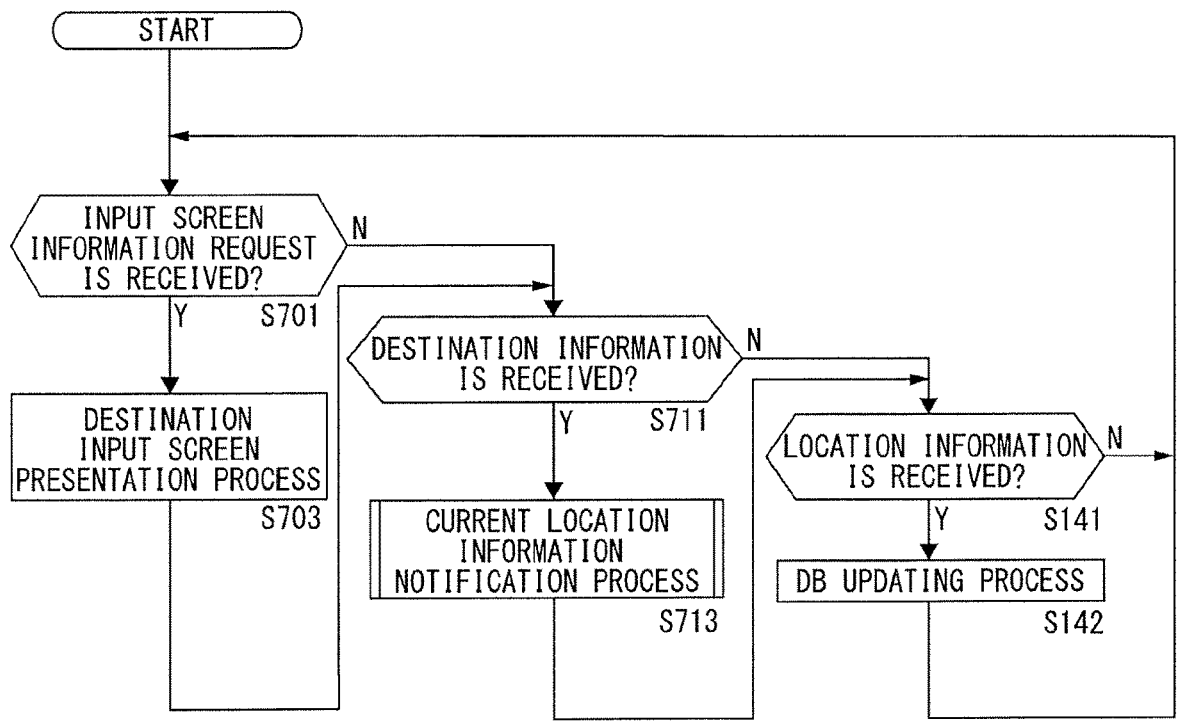
Figure 26:
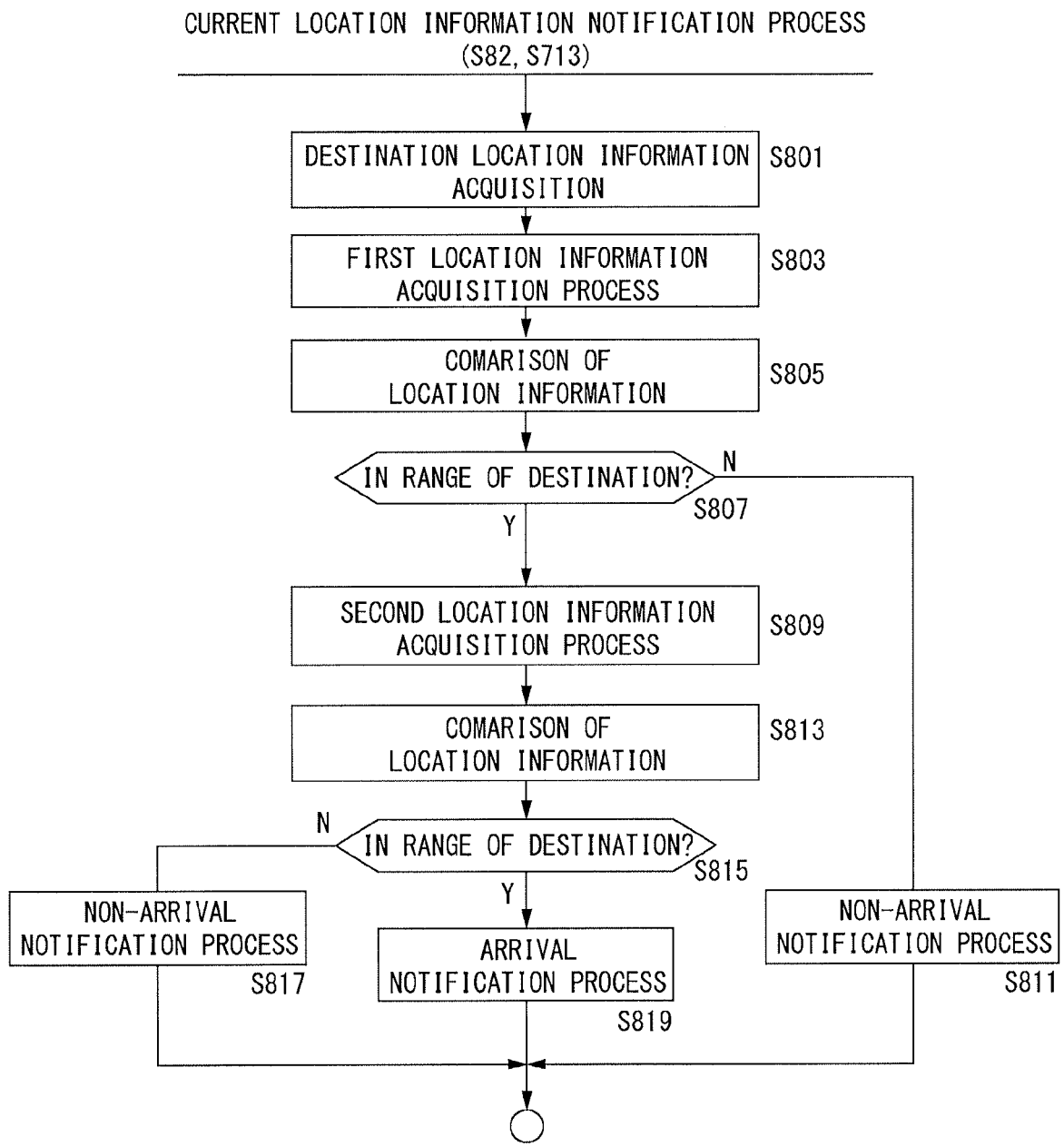
FIG. 26 is a flowchart showing a current location information notification process performed by the third embodiment.

FIG. 25A shows an exemplary flow of the processing performed by the distribution server 2 and by the user terminal 4. What is explained below is an example in which a user utilizing a user terminal 4 requests the location information about the destination using the location information distribution service provided by the distribution server 2.

In step S71, the user terminal 4 sends a request to the distribution server 2 for the information constituting an input screen to which to input the information about the shop as the destination.

Upon receipt of the input screen information request from the user terminal 4, the distribution server 2 goes to step S81 to perform an input screen information presentation process. That is, the distribution server 2 causes the user terminal 4 to display a destination input screen.

Thereafter, the user terminal 4 goes to step S72. In step S72, the user terminal 4 transmits the information about the destination to the distribution server 2 in response to the input operations performed by the user on the destination input screen.

Upon receiving the destination information, the distribution server 2 goes to step S82. In step S82, the distribution server 2 performs a current location information notification process to determine whether or not the user has arrived at the destination in keeping with the type of the acquired user location information and then give notification of arrival or non-arrival.

The steps described above make up the general flow of the processing performed by the distribution server 2 to provide the service.

Described below with reference to FIG. 24B is the processing performed by the distribution server 2 to implement the location information distribution service outlined above.

In steps S701, S711, and S141, the distribution server 2 performs processes of determining whether or not the user location information or other relevant information has been received from the user terminal 4.

If in step S701 the distribution server 2 determines that a request is received from a user terminal 4 for the information constituting a screen to which to input destination information, the distribution server 2 passes control from step S701 to step S703. In step S703, the distribution server 2 performs a process of presenting the destination input screen.

Specifically, the distribution server 2 acquires from the webpage DB 5d the screen information (webpage data) constituting the attribute information screen, and transmits the acquired screen information to the user terminal 4. Upon receipt of the screen information, the user terminal 4 displays the destination input screen.

If in step S711 the distribution server 2 determines that the destination information is received from the user terminal 4, the distribution server 2 passes control from step S711 to S713 to perform a current location information notification process. The current location information notification process will be discussed later in detail.

In step S141, the distribution server 2 performs a process of determining whether or not the location information is received from the user terminal 4.

Upon determining that the location information is received from the user terminal 4, the distribution server 2 passes control from step S141 to step S142 to perform a location DB updating process.

Specifically, as in the processing of FIG. 11, the distribution server 2 receives the location information transmitted periodically from the numerous user terminals 4. Every time the location information is received from a user terminal 4, the distribution server 2 stores the received location information into the location DB 5b in association with the corresponding user ID. Particularly in the present embodiment, both the GPS location information and the beacon are used as the location information. The distribution server 2 thus determines whether the received location information is obtained by a GPS receiver or on the basis of the beacon ID. The type of location information determined in this manner is also stored into the location DB 5b.

After completing the process of step S141 or S142, the distribution server 2 returns to step S701 and repeats the subsequent steps.

The current location information notification process (steps S82 and S713) is described below with reference to FIG. 26.

First in step S801, the distribution server 2 performs a process of acquiring the location information about the destination (destination location information acquisition). Based on the destination information received from the user terminal 4, the distribution server 2 acquires the location information about the shop as the destination from the shop DB 5c that records the shop information, for example.

In step S803, the distribution server 2 performs a process of acquiring first location information. For example, the distribution server 2 acquires as the current location the latitude and longitude information, from the information received most recently by a GPS receiver and recorded in the location DB 5b.

In step S805, the distribution server 2 compares the location based on the first location information with the destination location information. In step S807, the distribution server 2 determines whether or not the location based on the first location information is included in a range based on the destination location information. It is assumed that the range based on the destination location information is, for example, set beforehand for each building in consideration of its size.

If it is determined that the location based on the first location information is not included in the range based on the destination location information, the distribution server 2 passes control from step S807 to step S811. In step S811, the distribution server 2 performs a non-arrival notification process to notify the user terminal 4 that the user has yet to arrive at the building of the destination. In this case, the distribution server 2 may simultaneously transmit the location information about the building at the destination. Other ways of notification may involve providing route guidance toward the destination building if the building is nearby, or displaying the telephone number of the shop.

If it is determined that the location based on the first location information is included in the range based on the destination location information, the distribution server 2 passes control from step S807 to step S809. In step S809, the distribution server 2 performs a process of acquiring second location information.

For example, the distribution server 2 acquires the most recent location information about the beacon from the location DB 5b.

In step S813, the distribution server 2 compares the location based on the second location information with the location based on the destination location information. In step S815, the distribution server 2 determines whether or not the location based on the second location information is included in a range based on the destination location information.

If it is determined that the location based on the second location information is not included in the range based on the destination location information, the distribution server 2 passes control from step S815 to step S817. In step S817, the distribution server 2 performs a non-arrival notification process to notify the user terminal 4 that the user has arrived at the destination building but is on the wrong floor, for example. In this case, the distribution server 2 may simultaneously transmit the location information saying, for example, that the user has arrived at the destination building but is on the wrong floor. If the address information about the shop is stored in the shop DB 5c, the distribution server 2 may acquire from the address information the floor on which the shop is located and notify the user terminal 4 thereof.

If it is determined that the location based on the second location information is included in the range based on the destination location information, the distribution server 2 passes control from step S815 to step S819. In step S819, the distribution server 2 performs an arrival notification process to give notification that the user has arrived at the destination.

By performing the process of step S811, S817, or S819, the distribution server 2 completes the current location information notification process.

11. Conclusion

The above-described embodiments of the present disclosure provide the following advantages:

The distribution server 2 (information processing device) as one embodiment includes a distribution target determination unit configured to determine that a terminal located within a first predetermined range detected by a first detection technique (e.g., a technique using GPS) is a first distribution target terminal and that a terminal located within a second predetermined range included in the first predetermined range and detected by a second detection technique (e.g., a technique using the near field communication technology such as BLE beacon or ultrasonic communication) is a second distribution target terminal; a distribution request acquisition unit configured to acquire a distribution request from a distribution requester terminal; and an information distribution unit configured to distribute information corresponding to the distribution request to the first distribution target terminal, the first distribution target terminal not overlapping with the second distribution terminal, or the second distribution target terminal.

Because the different detection techniques are used to set the ranges for detecting the distribution target terminals, it is possible to determine the terminals in a manner taking advantage of the characteristics of each detection technique covering a specific terminal detection range. Also, because the multiple detection technique are used to detect the terminals, fewer applicable terminals are overlooked. This makes it possible to determine the locations of the users' terminals with more accuracy and flexibility.

If the distribution requester is the shop manager, the shop manager can select, for example, the first distribution target terminal, the first distribution terminal not overlapping with the second distribution terminal, or the second distribution terminal as desired for distribution as he likes. In this manner, the shop manager can flexibly set the target range for distribution.

If it is desired to distribute the coupon to the user terminal 4 located in or near the shop, with the first detection technique using GPS and with the second detection technique using the beacon, the coupon is distributed in the second predetermined range by use of the beacon. Using the beacon permits more accurate distribution of the coupon to the users in or near the shop than using GPS. Furthermore, comparing the first predetermined range with the second predetermined range makes it possible to distribute the coupon more accurately to the terminal that is the first distribution target terminal but does not overlap with the second distribution target terminal, e.g., the user terminal 4 of the user located outside the shop, than if GPS alone is used.

If the distribution requester is a user, with not only GPS (first detection technique) detecting the location information in latitude and longitude about the destination but also with the beacon (second detection technique) in use, the distribution server 2 may determine that GPS information as well as the beacon ID is being received. In such a case, the distribution server 2 using the beacon ID can notify the user terminal 4 that the user has arrived at the destination building but that the target shop is on a different floor, for example. In this manner, if the user arriving at the destination finds the building too extensive or the shops therein too confusing, the user can be notified of the exact location of the destination shop elsewhere inside the building.

Further, the distribution server 2 (information processing device) may determine that a terminal detected by the first detection technique and located within a third predetermined range wider than the first predetermined range is a third distribution target terminal. This allows more flexible setting of the range of detection suitable for the purpose of information distribution.

This allows the shop manager (distribution requester) to distribute information such as the coupon from the shop to the user terminal 4 located at a preferable distance from the shop in keeping with the purpose and the content of the distribution.

Preferably in the distribution server 2 (information processing device), the second detection technique may be a detection technique configured to use a communication system of which the signal has more difficulty in penetrating a wall than the first detection technique. Using such second detection technique permits more accurate detection of the number of terminals inside the premises (e.g., shop).

Preferably in the distribution server 2 (information processing device), the distribution target determination unit may determine that, of the terminals estimated to be located within the first predetermined range, a terminal whose user is applicable to an attribute condition acquired from the distribution requester terminal is the first distribution target terminal and that, of the terminals estimated to be located within the second predetermined range, a terminal whose user is applicable to the attribute condition acquired from the distribution requester terminal is the second distribution target terminal.

This allows the distribution requester to ascertain easily the number of terminals owned by the users who have the attributes desirable for distribution and who are located around the premises (e.g., shop).

Preferably, the information processing device above may further include a calculation unit configured to calculate the number of the first distribution target terminals and the number of the second distribution target terminals, and a presentation control unit configured to cause the distribution requester terminal to present the number of the first distribution target terminals and the number of the second distribution target terminals.

This allows a staff member (distribution requester) of the premises (e.g., shop) to ascertain the proportion of the persons having an attribute other than the attribute corresponding to the attribute condition selected by the staff member.

The shop manager can thus verify easily the number of the persons who have the attributes desirable for distribution and who are located around the shop. When the distribution information corresponding to the verified number of the distribution target persons is created, it is possible to distribute the coupon of which the content is suitably arranged to better attract the attention of the distribution target persons.

12. Program and Storage Medium

A program as another embodiment of the present disclosure causes an information processing device to perform a process of determining that a terminal located within a first predetermined range and detected by a first detection technique is a first distribution target terminal and that a terminal located within a second predetermined range and detected by a second detection technique is a second distribution target terminal, where the second predetermined range is included in the first predetermined range; a process of acquiring a distribution request from a distribution requester terminal; and a process of distributing information corresponding to the distribution request to at least the first distribution target terminal, the first distribution target terminal not overlapping with the second distribution terminal, or the second distribution target terminal.

That is, this is a program that causes the distribution server 2 to perform the processes described above with reference to FIGS. 24A to 26.

The above-described program implements the information processing device serving as the distribution server 2 explained above.

The program may be recorded in advance on an HDD as an internal recording medium incorporated typically in a device such as a computer device or stored beforehand in a ROM inside a microcomputer having a CPU, or the like. Alternatively, the program may be stored (recorded) temporarily or permanently on a removable recording medium such as a semiconductor memory, a memory card, an optical disk, a magneto-optical disk, a magnetic disk, or the like. Such removable recording media may be offered in the form of so-called package software.

The program may be installed from the removable recording medium into a personal computer, for example. The program may also be downloaded from a download site via a network such as a LAN or the Internet.

In the above-described embodiments of the present disclosure, the coupon was shown as an example of the distribution information and the coupon distribution system was described. However, the information to be distributed with the present disclosure is not limited to the coupon. The distribution information is not limited to anything specific as long as it deals with a predetermined matter. For example, the distribution information may include advertisements, admission tickets to the premises, numbered tickets to the premises, various guides to the premises, introductory information, and blogs and reviews about the premises such as shops. The distribution information may be transmitted from the distribution server 2 directly to the user terminal 4 via the network 1. Alternatively, the distribution information may be sent to and stored in a BLE transmitter serving as the second detection technique, for example. In turn, the BLE transmitter may transmit the distribution information to the user terminal 4.

The present disclosure is thus applicable not only to the shops but also to diverse premises including public facilities, event venues, amusement parks, theme parks, and public gardens. In such cases, the distribution requester terminal is a terminal device used by the staff of these premises.

In the above-described embodiments, the shop manager was assumed to be the distribution requester, and each user receiving the coupon through the user terminal was assumed to be the distribution target person. However, the relationship between the "shop manager" and the "distribution target person" of the present disclosure need not be construed only as the relationship between the "shop" and "each person who receives the distribution of the coupon." Alternatively, there may be diverse relationships between the distribution requester and the distribution target person, such as between a "concert venue" and a "person receiving the distribution of numbered tickets thereto," between a "library" and a "person receiving introductory information about recommended books thereby," and between a "school" and a "person receiving information about the courses offered therein."

Lastly, the above-described embodiments are only examples of the present disclosure and are not limitative thereof. It is obvious that various modifications, variations and alternatives may be made of the disclosure so far as they fall within the scope and technical idea thereof.

REFERENCE SIGNS LIST

1 . . . Network, 2 . . . Distribution server, 3 . . . Shop terminal, 4 . . . User terminal, 2a . . . Attribute condition acquisition unit, 2b . . . Distribution candidate determination unit, 2c . . . Distribution target person determination unit, 2d . . . Headcount calculation unit, 2e . . . Presentation control unit, 2f . . . Distribution request acquisition unit, 2g . . . Information distribution unit, 2h . . . Staying person headcount determination unit, 2i . . . Attribute-wise headcount calculation unit, 2j . . . Attribute-wise proportion calculation unit

What is claimed is:
1. An information processing device comprising:
at least one non-transitory memory operable to store program code; and
at least one processor operable to read said program code and operate as instructed by said program code, said program code comprising:
  distribution target determination code configured to cause the at least one processor to:
    determine whether a terminal is determined to be located within a first predetermined range using a first detection technique,
    determine whether the terminal is determined to be located within a second predetermined range using a second detection technique, the second predetermined range being included in the first predetermined range,
    classify the terminal as a first non-overlapping distribution target terminal based on the terminal being located within the first predetermined range, located using the first detection technique, and not located using the second detection technique, and
    classify the terminal as a second distribution target terminal based on the terminal being located within the second predetermined range and located using the second detection technique;
  distribution request acquisition code configured to cause the at least one processor to acquire a distribution request from a distribution requester terminal, the distribution request indicating, as a target terminal, the first non-overlapping distribution target terminal or the second distribution target terminal; and information distribution code configured to cause the at least one processor to distribute information corresponding to the distribution request to the target terminal.

2. The information processing device according to claim 1, wherein the distribution target determination code is further configured to cause the at least one processor to:
determine whether the terminal is determined to be located within a third predetermined range wider than the first predetermined range using the first detection technique, and
classify the terminal as a third distribution target terminal based on the terminal being located within the third predetermined range.

3. The information processing device according to claim 1, wherein the second detection technique is a detection technique configured to use a communication system of which a signal has more difficulty in penetrating a wall than the first detection technique.

4. The information processing device according to claim 1, wherein the distribution target determination code is further configured to cause the at least one processor to:
identify the terminal, from among a first plurality of terminals located within the first predetermined range and not located using the second detection technique, as the first non-overlapping distribution target terminal based on the terminal corresponding to an attribute condition acquired from the distribution requester terminal, and
identify the terminal, from among a second plurality of terminals located within the second predetermined range, as the second distribution target terminal based on the terminal corresponding to the attribute condition acquired from the distribution requester terminal.

5. The information processing device according to claim 1, wherein said program code further comprises:
calculation code configured to control the at least one processor to calculate the number of the first non-overlapping distribution target terminals and the number of the second distribution target terminals; and
presentation control code configured to control the at least one processor to transmit information to the distribution requester terminal to cause the distribution requester terminal to present the number of the first non-overlapping distribution target terminals and the number of the second distribution target terminals.

6. The information processing device according to claim 4, wherein said program code further comprises:
calculation code configured to cause the at least one processor to calculate the number of the first non-overlapping distribution target terminals and the number of the second distribution target terminals; and
presentation control code configured to control the at least one processor to transmit information to the distribution terminal to cause the distribution requester terminal to present the number of the first non-overlapping distribution target terminals and the number of the second distribution target terminals.

7. An information processing method performed by an information processing device, comprising:
determining whether a terminal is determined to be located within a first predetermined range using a first detection technique;
determining whether the terminal is determined to be located within a second predetermined range using a second detection technique, the second predetermined range being included in the first predetermined range;
classifying the terminal as a first non-overlapping distribution target terminal based on the terminal being located within the first predetermined range, located using the first detection technique, and not located using the second detection technique;
classifying the terminal as a second distribution target terminal based on the terminal being located within the second predetermined range and located using the second detection technique;
acquiring a distribution request from a distribution requester terminal, the distribution request indicating, as a target terminal, the first non-overlapping distribution target terminal or the second distribution target terminal; and
distributing information corresponding to the distribution request to the target terminal.

8. A non-transitory computer-readable storage medium that stores a program for causing a computer to:
determine whether a terminal is determined to be located within a first predetermined range using a first detection technique;
determine whether the terminal is determined to be located within a second predetermined range using a second detection technique, the second predetermined range being included in the first predetermined range;
classify the terminal as a first non-overlapping distribution target terminal based on the terminal being located within the first predetermined range, located using the first detection technique, and not located using the second detection technique;
classify the terminal as a second distribution target terminal based on the terminal being located within the second predetermined range and located using the second detection technique;
acquire a distribution request from a distribution requester terminal, the distribution request indicating, as a target terminal, the first non-overlapping distribution target terminal or the second distribution target terminal; and
distribute information corresponding to the distribution request to the target terminal.

* * * * *